US008429110B2

(12) United States Patent
Cai et al.

(10) Patent No.: US 8,429,110 B2
(45) Date of Patent: Apr. 23, 2013

(54) PATTERN TREE-BASED RULE LEARNING

(75) Inventors: Rui Cai, Beijing (CN); Lei Zhang, Beijing (CN); Jiang-Ming Yang, Beijing (CN); Yan Ke, Redmond, WA (US); Xiaodong Fan, Bellevue, WA (US); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 401 days.

(21) Appl. No.: 12/813,171

(22) Filed: Jun. 10, 2010

(65) Prior Publication Data

US 2011/0307436 A1    Dec. 15, 2011

(51) Int. Cl.
G06F 17/00    (2006.01)
G06N 5/00    (2006.01)

(52) U.S. Cl.
USPC .......................................................... 706/45

(58) Field of Classification Search ...................... 706/45
See application file for complete search history.

(56) References Cited

U.S. PATENT DOCUMENTS

| 7,185,088 | B1 |   | 2/2007 | Joy et al. |         |
|-----------|----|---|--------|-----------|---------|
| 7,680,785 | B2 |   | 3/2010 | Najork    |         |
| 7,698,294 | B2 | * | 4/2010 | Ma et al. | 707/741 |
| 7,779,001 | B2 | * | 8/2010 | Zeng et al. | 707/726 |
| 7,783,979 | B1 | * | 8/2010 | Leblang et al. | 715/739 |
| 7,890,502 | B2 | * | 2/2011 | Liu et al. | 707/726 |
| 7,917,355 | B2 | * | 3/2011 | Wu et al. | 704/10 |
| 7,983,902 | B2 | * | 7/2011 | Wu et al. | 704/10 |
| 8,051,083 | B2 | * | 11/2011 | Lai et al. | 707/737 |
| 8,073,789 | B2 | * | 12/2011 | Wang et al. | 706/12 |
| 8,095,478 | B2 | * | 1/2012 | Ma et al. | 706/11 |
| 8,145,592 | B2 | * | 3/2012 | Liu et al. | 706/62 |
| 2008/0288491 | A1 |   | 11/2008 | Wu et al. | |
| 2009/0164502 | A1 |   | 6/2009 | Dasgupta et al. | |

OTHER PUBLICATIONS

Carvalho, et al., "A cost-effective method for detecting web site replicas on search engine databases," Data & Knowledge Engineering, vol. 62, Issue 3, Sep. 2007, pp. 421-437.

Andoni, Indyk, "Near-Optimal Hashing Algorithms for Approximate Nearest Neighbor in High Dimensions", retrieved on Apr. 16, 2010 at <<people.csail.mit.edu/indyk/FOCS06final.ps>>, IEEE Computer Society, Proceedings of Symposium on Foundations of Computer Science (FOCS), 2006, pp. 459-468.

Angluin, "Finding Patterns Common to a Set of Strings", retrieved on Apr. 16, 2010 at <<http://portal.acm.org/citation.cfm?id=800135. 804406>>, ACM, Symposium on Theory of Computing, 1979, pp. 130-141.

Berners-Lee, Fielding, Masinter, "Uniform Resource Identifier (URI): Generic Syntax", retrieved on Apr. 16, 2010 at <<http://tools. ietf.org/html/rfc3986>>, The Internet Society, Standards Track, Jan. 2005, pp. 1-62.

Brin, Page, "The Anatomy of a Large-Scale Hypertextual Web Search Engine", retrieved on Apr. 16, 2010 at <<http://citeseerx.ist. psu.edu/viewdoc/download;jsessionid= A4D86CA78C8B98A47ACF8F9C754549E0?doi=10.1.1.42.3243 &rep=rep1&type=pdf>>, Elsevier Science Publishers Amsterdam, Computer Networks and ISDN Systems, vol. 30, No. 1-7, Apr. 1998, pp. 107-117.

(Continued)

*Primary Examiner* — Michael B Holmes
(74) *Attorney, Agent, or Firm* — Lee & Hayes, PLLC

(57) ABSTRACT

A pattern tree is constructed based on a plurality of key-value pairs representing portions of a data set. In some implementations, the pattern tree may be used for learning one or more rules for interacting with a source of the data set.

20 Claims, 13 Drawing Sheets

OTHER PUBLICATIONS

Broder, Glassman, Manasse, Zweig, "Syntactic Clustering of the Web", retrieved on Apr. 16, 2010 at <<http://research.microsoft.com/pubs/77977/src-tn-1997-015.pdf>>, Elsevier Science Publishers Amsterdam, Computer Networks and ISDN Systems, vol. 29, No. 8-13, Sep. 1997, pp. 1157-1166.

Charikar, "Similarity Estimation Techniques from Rounding Algorithms", retrieved on Apr. 16, 2010 at <<http://citeseerx.ist.psu.edu/viewdoc/download?doi=10.1.1.147.4064&rep=rep1&type=pdf>>, ACM, Symposium on Theory of Computing (STOC), May 19, 2002, pp. 380-388.

Chowdhury, Frieder, Grossman, McCabe, "Collection Statistics for Fast Duplicate Document Detection", retrieved on Apr. 16, 2010 at <<http://www.ir.iit.edu/~dagr/2002collectionstatisticsfor.pdf>>, ACM, Transactions on Information Systems, vol. 20, No. 2, Apr. 2002, pp. 171-191.

Dasgupta, Kumar, Sasturkar, "De-duping URLs via Rewrite Rules", retrieved on Apr. 16, 2010 at <<http://research.yahoo.com/files/kdd611-dasgupta.pdf>>, ACM, Conference on Knowledge Discovery and Data Mining (KDD), Aug. 24, 2008, pp. 186-194.

"Duplicate URL Cleaner", retrieved Apr. 16, 2010 at <<http://activeurls.com/online_help/en/interface/duplicate_url_cleaner.htm>>, 2010, pp. 1-2.

"Google Webmaster Central Blog: Specify Your Canonical", retrieved on Apr. 16, 2010 at <<http://googlewebmastercentral.blogspot.com/2009/02/specify-your-canonical.html>>, Google Inc., Feb. 12, 2009, pp. 1-4.

Henzinger, "Finding Near-Duplicate Web Pages: A Large-Scale Evaluation of Algorithms", retrieved on Apr. 16, 2010 at <<http://citeseerx.ist.psu.edu/viewdoc/download?doi=10.1.1.86.9596&rep=rep1&type=pdf>>, ACM, Conference on Research and Development in Information Retrieval (SIGIR), Aug. 6, 2006, pp. 284-291.

Koppula, Leela, Agarwal, Prasad, Garg, Sasturkar, "Learning URL Patterns for Webpage De-duplication", retrieved on Apr. 16, 2010 at <<http://www.wsdm-conference.org/2010/proceedings/docs/p381.pdf>>, ACM, Proceedings of Conference on Web Search and Web Data Mining (WSDM), Feb. 4, 2010, pp. 381-390.

Manku, Jain, Sarma, "Detecting Near-Duplicates for Web Crawling", retrieved on Apr. 16, 2010 at <<http://citeseerx.ist.psu.edu/viewdoc/download?doi=10.1.1.78.7794&rep=rep1&type=pdf>>, ACM, Conference on World Wide Web (WWW), May 8, 2007, pp. 141-149.

Pant, Srinivasan, Menczer, "Crawling the Web", retrieved on Apr. 16, 2010 at <<http://dollar.biz.uiowa.edu/~pant/Papers/crawling.pdf>>, Springer-Verlag, Web Dynamics: Adapting to Change in Content, Size, Topology and Use, 2004, pp. 1-25.

Rabin, "Fingerprinting by Random Polynomials", retrieved on Apr. 16, 2010 at <<http://www.xmailserver.org/rabin.pdf>>, Harvard University, Center for Research in Computing Technology, Technical Report TR-15-81, 1981, pp. 15-18.

Schonfeld, Bar-Yossef, Keidar, "Do not Crawl in the DUST: Different URLs with Similar Text Extended Abstract", retrieved on Apr. 16, 2010 at <<http://www2006.org/programme/files/pdf/p20.pdf>>, ACM, Conference on World Wide Web (WWW), May 23, 2006, pp. 1-2.

"URL Normalization", retrieved on Apr. 16, 2010 at <<http://en.wikipedia.org/wiki/URL_normalization>>, Wikipedia, 2010, pp. 1-3.

Xiao, Wang, Lin, Yu, "Efficient Similarity Joins for Near Duplicate Detection", retrieved on Apr. 16, 2010 at <<http://citeseerx.ist.psu.edu/viewdoc/download?doi=10.1.1.121.6601&rep=rep1&type=pdf>>, ACM, Conference on World Wide Web (WWW), Apr. 21, 2008, pp. 131-140.

\* cited by examiner

PATTERN TREE-BASED RULE LEARNING

BACKGROUND

Tree data structures are widely used to represent hierarchical relationships. A typical tree includes a plurality of nodes, each of which may represent a value or condition. Each node in a tree has zero or more child nodes and, at most, one parent node. Sibling nodes are nodes that share the same parent node. The topmost node in a tree is called the root node, and, as the node with the highest hierarchical level, is often the node on the tree at which operations begin. All other nodes on the tree can be reached by following a path from the root node. The depth of a particular node on the tree is the length of the path to that node from the root node, and typically nodes having the same depth are of the same hierarchical level. Consequently, it is possible to use a tree data structure to represent a hierarchical pattern, structure, configuration or the like.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations disclosed herein provide for constructing a pattern tree based on a data set and using the pattern tree to determine one or more rules to be used for interacting with the source of the data.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Pattern Tree-Based Rule Learning

The technologies described herein are generally directed towards automatically learning one or more rules for computing device activity. Implementations may include construction of a pattern tree from a sample data set and generating candidate rules based on the constructed pattern tree. Rule selection may then be carried out on the candidate rules to determine specific deployable rules. The deployable rules can be applied during computing device interaction with the source of the sample data.

Some example implementations herein are described in the environment of a search engine. For instance, some implementations use automatic rule learning for URL (Uniform Resource Locator) de-duplication and normalization during website crawling and indexing by a search engine. However, the implementations disclosed are not limited to the de-duplication examples discussed herein, and can be applied in numerous other environments, applications and contexts, such as click monitoring, data mining and cataloging, discussion forum indexing, social network indexing, and the like.

Figure 1:
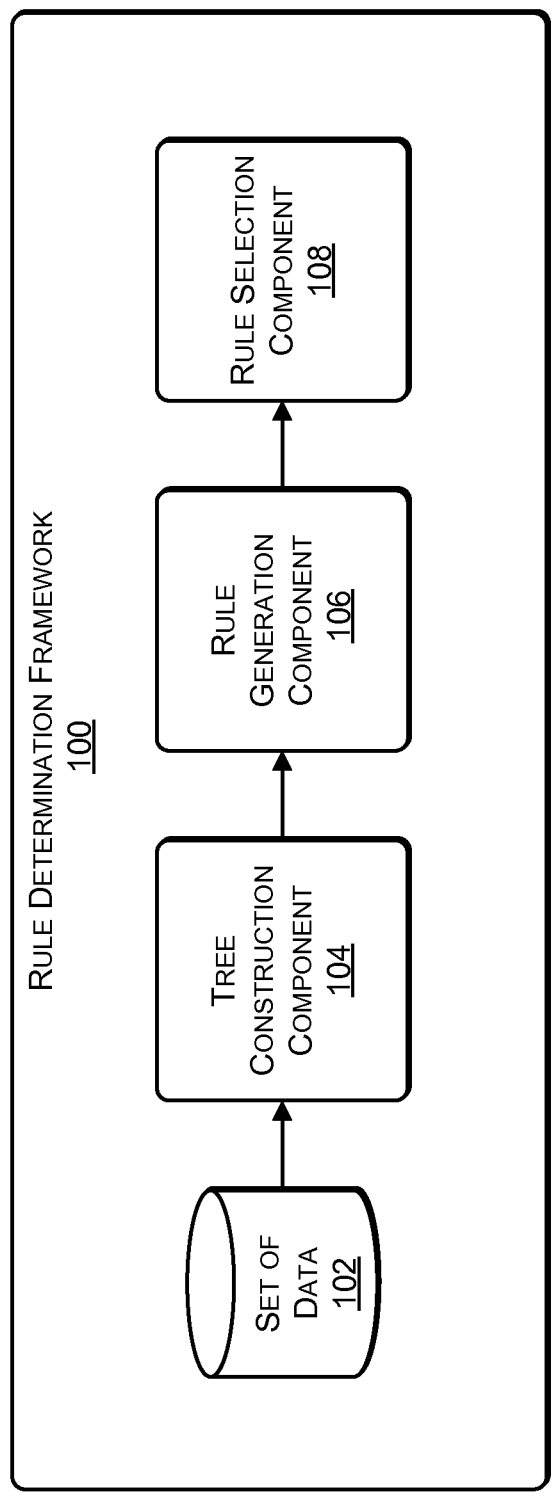
FIG. 1 is a block diagram of an example of a framework for rule learning according to some implementations disclosed herein.

FIG. 1 illustrates an example of a rule determination framework 100 for explanation purposes. In the illustrated example, rule determination framework 100 includes a set of data 102, which may be collected from a source for which one or more rules are to be determined. A tree construction component 104 constructs a pattern tree from the set of data based on hierarchical structural interpretation of the data. A rule generation component 106 processes the pattern tree generated by the tree construction component 104 to identify similar nodes of the pattern tree and to generate a plurality of candidate rules from the pattern tree based on the identified similar nodes. A rule selection component 108 is configured to apply a selection process to identify one or more deployable rules from the candidate rules, such as by eliminating candidate rules causing redundancies and conflicts. The selected one or more deployable rules may then be used for interacting with the source of the set of data 102.

Figure 2:
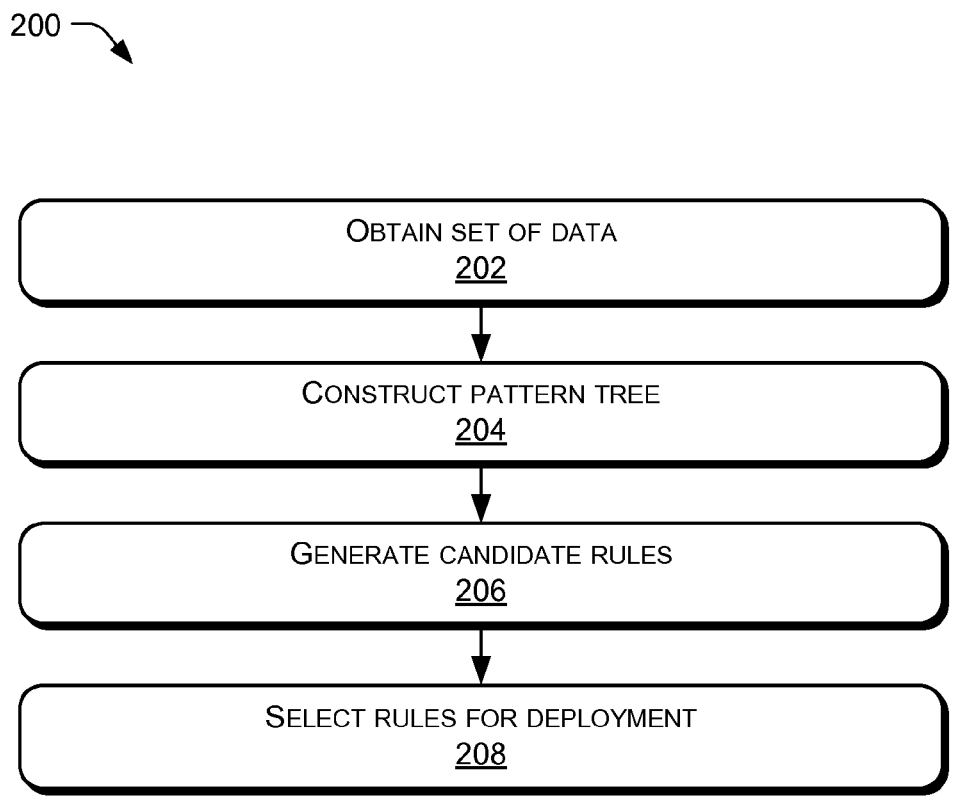
FIG. 2 is a flow diagram of an example of a process for rule learning according to some implementations.

FIG. 2 illustrates an example of a process 200 for rule generation and determination according to some implementations herein. In the flow diagram, the operations are summarized in individual blocks. The operations may be performed in hardware, or as processor-executable instructions (software or firmware) that may be executed by one or more processors. Further, the process 200 may, but need not necessarily, be implemented using the framework of FIG. 1. Consequently, by way of explanation, and not limitation, the process 200 is described in the context of the framework of FIG. 1.

At block 202, a set of data is obtained from a source for use in determining one or more rules to deploy for interacting with the source.

At block 204, a pattern tree is constructed using the set of data. For example, in some implementations, as described additionally below, the data can be broken down into key-value pairs. The key value pairs can be determined for discrete portions of the data and a distribution of values under each key can be evaluated for constructing the pattern tree. Other techniques of constructing the pattern tree may also be applied.

At block 206, candidate rules are generated using the pattern tree by determining nodes of the pattern tree that are sufficiently similar to each other. For example, when a particular node corresponds to data or content that is highly similar or the same as data or content of another node, then a rule can be established for relating the two nodes. Thus, for every two similar or duplicate nodes, a candidate rule can be established.

At block 208, one or more deployable rules are selected from the candidate rules. For example, a subset of the candidate rules may be identified for deployment by eliminating redundant and conflicting rules. In some implementations, as described additionally below, a graph data structure can be used for selecting the rules by taking into consideration popularity or other statistical attributes of particular nodes of the pattern tree.

Thus, the foregoing sets forth a framework and process for automatically determining one or more rules using a pattern tree constructed from a sample data set. Following determination and selection of the one or more deployable rules, the deployable rules can be used during interaction with the source of the set of data or in other relevant applications or environments.

URL De-Duplication

Some examples herein are described in the context of a search engine and URL de-duplication and normalization. Often a number of different URLs will reference the same content on the World Wide Web (WWW). For example, multiple, such as a particular webpage. These URLs that link to the same content are referred to as duplicate URLs (also sometimes called "DUST"—Different URLs with Similar Text). There are numerous reasons for the creation of duplicate URLs. For example, some websites may have mirror sites that are used to balance loads or serve as backups. Further, some websites may have multiple URLs registered with different country codes, domains, etc. (e.g., "example.org" and "example.com") that point to a common webpage. Duplicate URLs can also be used to enable a website to provide more personalized service and to make the website more user-friendly. For example, a website can insert additional parameters, such as a session ID, into a URL to identify a user connection or referral, even though such parameters may have no impact on the content of the retrieved webpage. Further, to make the web surfing experience smoother, website designers often add abundant aliasing URLs to websites as shortcuts to enable users to quickly navigate to target pages. Additionally, some industry conventions can result in duplicate URLs, such as adding a trailing slash or removing directory indexes (e.g., "default.asp"). As a result, the use of duplicate URLs has become quite common and helpful to both website designers and WWW users.

On the other hand, duplicate URLs can cause a number of problems for search engines. For example, during the web crawling process, a tremendous amount bandwidth and time can be wasted downloading large quantities of duplicate webpages for the duplicate URLs. Additionally, during indexing, a large number of hard disks and computers are used to store and process this redundant information, and consequently, the constructed index becomes bloated and inefficient. Furthermore, during use of link-based ranking algorithms, appropriate scores cannot be determined for these pages because the web link graph has been distorted by the duplicate URLs. What is more, during presentation of search results, duplicate URLs may cause users to be presented with duplicate entities in the search results, such as having multiple results listed, with each listed result pointing to the same webpage from a different URL. For instance, according to some statistics recently gathered by the inventors herein on an untreated corpus of 20 billion webpages, as many as one-quarter of the records may be duplicates. Consequently, most commercial search engines such as Bing™, Google®, and Yahoo!® attempt to identify and remove duplicate URLs. For example, Google® has even asked website designers to explicitly mark duplicate links in their websites.

Generally, there are two types of URL de-duplication approaches: content-based approaches and rule-based approaches. In the content-based approaches, the de-duplication is carried out during the indexing phase after website content has already been downloaded. The content-based approaches to de-duplication are able to accurately identify duplicate URLs since the content of the corresponding webpage is already known. However, from a practical point of view, content-based de-duping is carried out as offline post-processing after the duplicate webpage content has been downloaded. Consequently, content-based de-duplication does not help to conserve precious bandwidth, storage or processing time.

On the other hand, according to some implementations herein, a search engine can use rule-based de-duplication to identify duplicate URLs during a preprocessing stage such as web crawling. This rule-based approach enables online de-duplication by normalizing URLs before adding the URLs to the crawling queue. Thus, in the rule-based de-duplication herein, a collection of URL normalization rules (also referred to as "rewrite rules") can be learned for each website to be indexed prior to crawling the website. For instance, these normalization rules can be learned based on a set of training data retrieved from the website. In some implementations, the training data can be automatically collected by first sampling a number of webpages from the targeted website and then generating duplicate URL groups by comparing the fingerprints (i.e., content) of corresponding downloaded webpages. Once the URL normalization rules for the website have been learned from the training data, the rules can be used to determine whether two URLs are duplicates without having to download and examine the corresponding page content. For example, the rules can be used to rewrite two URLs identified as being duplicates into the same canonical form. The rule-based approach is particularly useful when dealing with large websites that may have many thousands or even millions of pages and corresponding URLs, many of which may be duplicates.

In addition, web designers typically apply certain principles when they design the URL scheme of a website. For instance, different URL components take on different functions, e.g., some components denote semantic categories and some others record browsing parameters. Accordingly, URL normalization can be used to determine which components are irrelevant to the page content. Further, if the design principles for a particular website are known, determining which components to normalize becomes relatively easier and more certain.

Some implementations herein are described in the context of automatically determining rules for URL normalization. These implementations approach URL normalization from a global perspective that includes using a pattern tree-based approach for determining URL rewrite rules to address the complications caused by duplicate URLs. For example, for each targeted website, a training set of URLs sampled from the website can be clustered and used to automatically construct a pattern tree. Based on the constructed pattern tree, statistical information from the training set can be leveraged into a robust and reliable learning process. During the learning process, candidate rules can be directly summarized based on analysis of the pattern tree nodes. In addition, the pattern tree can be used in the selection of deployable rules such as for identifying and removing conflicts and redundancies. Further, the rule determination techniques for URL normalization herein can be integrated into both online (e.g., crawling) and offline (e.g., index compression) portions of a search engine. Consequently, some implementations herein provide for an automated approach to URL normalization, which is highly useful when dealing with a huge amount of websites.

URLs as Pattern Trees

After investigating a substantial number of duplicate URLs, the inventors herein have determined that the design principles of a typical website can be revealed to some extent by a pattern tree. Consequently, a pattern tree may be equated to a group of hierarchically organized URL patterns. Each node (i.e., pattern) on a pattern tree may represent a group of URLs sharing the same syntax structure formation, and the pattern of a parent node may characterize all of its children nodes. In this way, the pattern tree is also able to provide statistics regarding the syntax scheme of a website. For example, in a pattern tree, salient URL tokens which express directories, functions, and document types may be explicitly represented by some nodes, while trivial tokens which denote parameter values may be generalized to some regular expressions.

Figure 3:
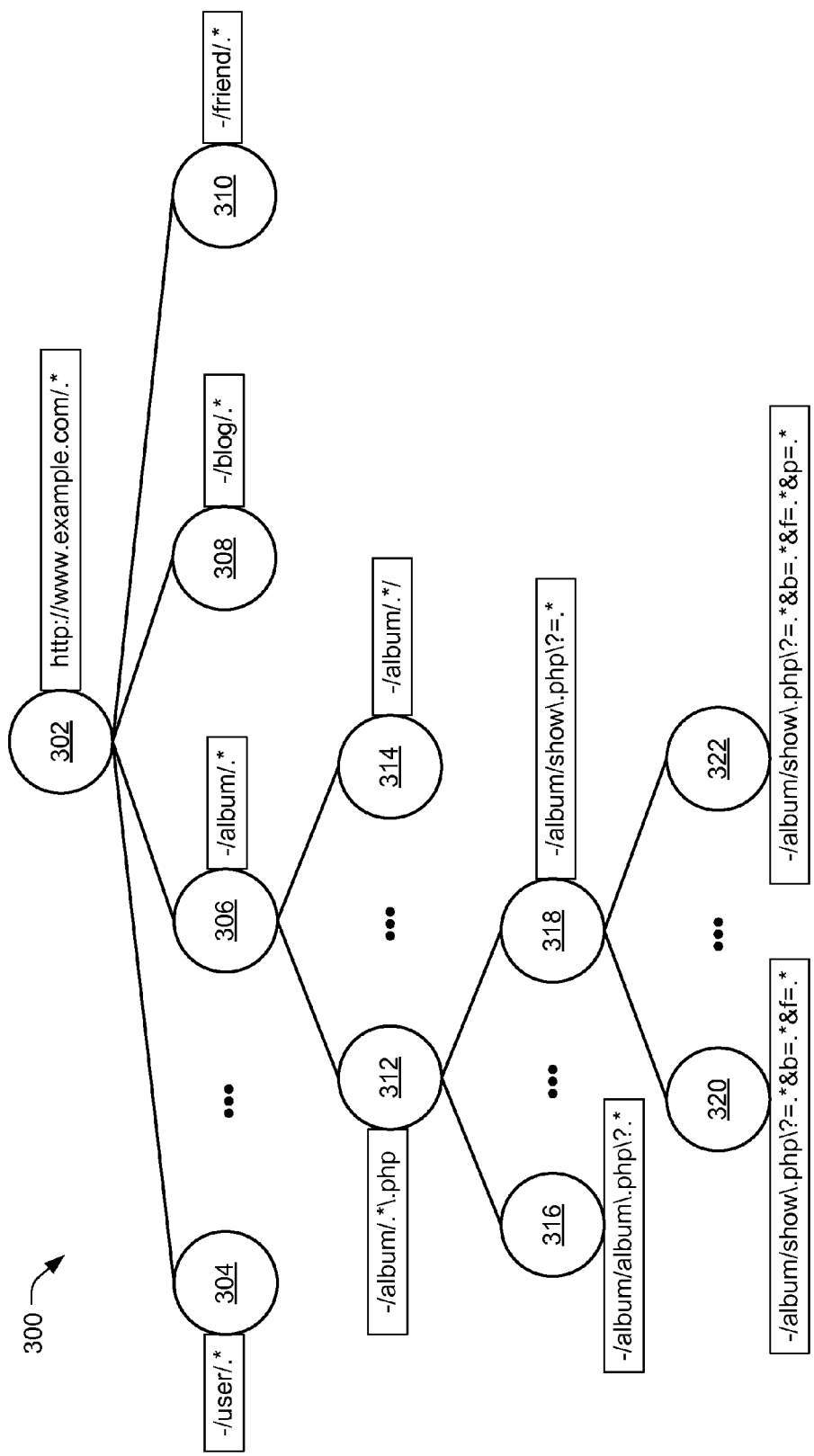
FIG. 3 illustrates an example of a pattern tree according to some implementations.

FIG. 3 illustrates an example according to some implementations herein for corresponding a website (e.g., www.example.com) to a structure of a pattern tree 300. (In accordance with MPEP 608.01 VII, none of the URLs used as examples herein are intended to be active links in this document. Deactivation of these links in this document is respectfully requested.) The pattern tree 300 illustrates examples of typical website patterns and their relationships. Pattern tree 300 includes a root node 302 representing "http://www.example.com/.*", where "*" is a wildcard notation covering any possible syntax. The pattern tree 300 includes a plurality of child nodes 304, 306, 308, 310 as examples of second tier nodes extending from the root node 302 for representing salient tokens, such as "user", "album", "blog", and "friend", respectively. Additionally, depending on the website structure, each child node may include additional children. In the illustrated example, album node 306 includes a plurality of child nodes 312, 314, as third tier nodes having a more specific nomenclature, i.e., "album/.*php" and "album/.*/", respectively. Further, node 312 is illustrated with a plurality of child nodes 316, 318, having a more specific nomenclature, and node 318 is illustrated having a plurality of child nodes 320, 322, with yet more specific nomenclature. For example, trivial tokens such as the values of the parameter "b" may be generalized to "b=.*" in the bottom nodes. Consequently, the example of FIG. 3 illustrates how a pattern tree 300 can be generated from a website, or a portion thereof, with the size and depth of the pattern tree 300 being dependent upon the size and structure of the particular website or website portion being modeled.

In addition, according to implementations herein, a normalization rule may be considered to transform a group of URLs having the same formation to another canonical formation. Consequently, implementations herein can determine a normalization rule as a mapping between two nodes on a pattern tree, where a tree node (i.e., a URL pattern) represents a set of URLs sharing the same formation. This approach enables the pattern tree to be used directly for learning URL normalization rules. Under this approach, a pattern tree may be automatically constructed for a given collection of URLs within a website (e.g., a sample set of URLs and corresponding content obtained from the targeted website). Following construction of the pattern tree, tree nodes having highly similar duplicate distributions can be identified, and based on the identified nodes, a set of candidate rules may be generated so that the URLs belonging to the identified tree nodes can be normalized to a canonical form. A graph-based strategy can then be applied to select deployable rules from the candidate rules, such as by eliminating conflicting or redundant rules. Because the learning process uses the tree nodes of the pattern tree instead of the URLs themselves, the computational cost is lower, as the number of tree nodes is typically much smaller than the number of original duplicate URL pairs. Moreover, the pattern tree can be used for statistical analysis of the training data and is not substantially affected by random noise in individual URLs. For example, webmasters sometimes re-design their websites as well as the URL formations. In such an updating, some URLs may be missed so that some legacy URL tokens may remain following the update. These legacy tokens may be thought of as a kind of noise encountered during the URL normalization process because they do not match a pattern of other URLs in the website. In addition, webmasters often use some parameters in URLs for debugging when developing a website, and these debugging parameters are not always completely removed when the website is released. These debugging parameters can also act as another kind of noise. URLs with such noise are typically not very popular URLs in a website, but can affect the performance of conventional algorithms used for generating URL de-duplication rules. However, the pattern tree approach set forth herein is not disrupted by these types of random noise. Accordingly, implementations herein are able to achieve a high level of de-duplication effectiveness in a computationally efficient manner.

Key-Value Representation of a URL

Figure 4:
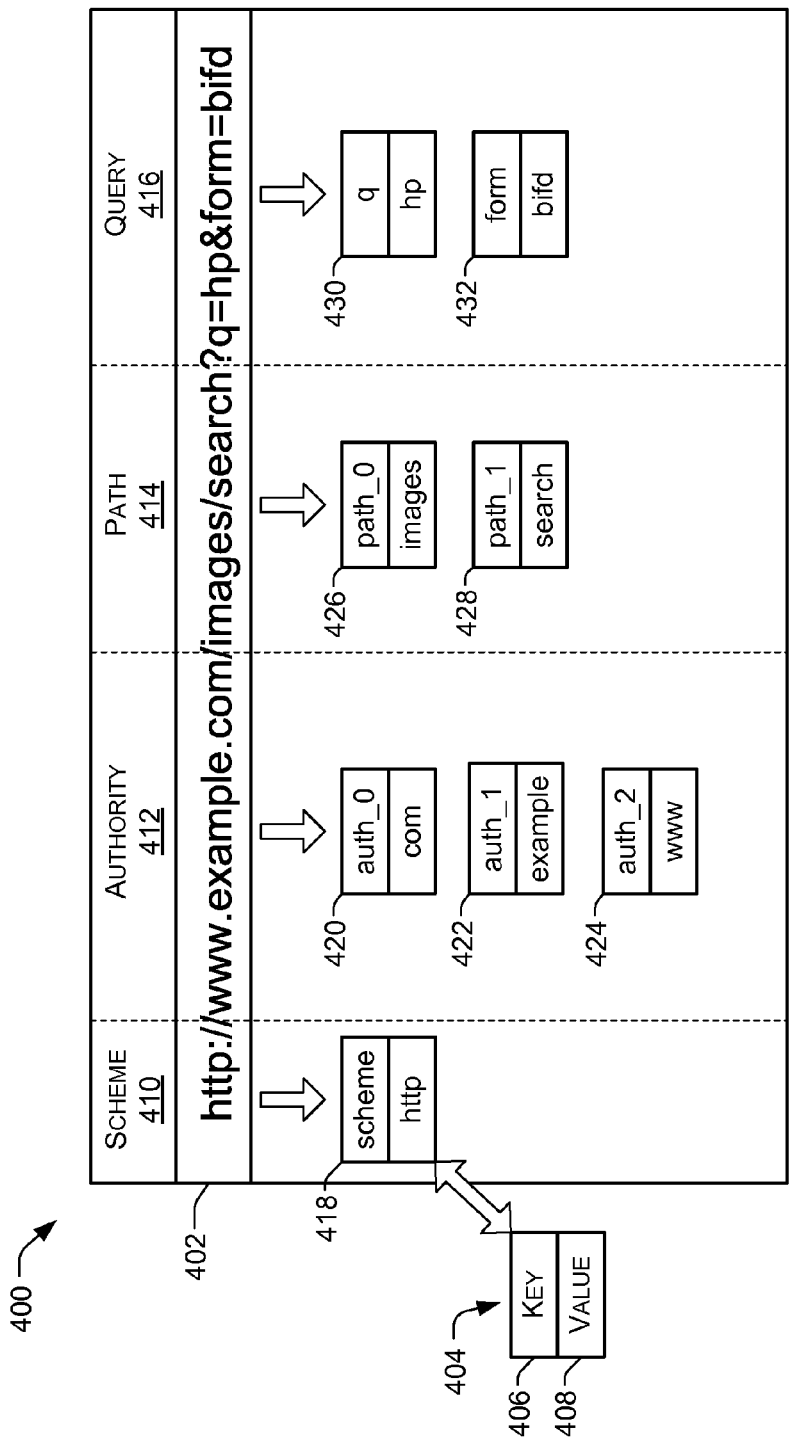
FIG. 4 illustrates an example of key-value pair formation according to some implementations.

FIG. 4 illustrates an example of a syntax structure 400 of a URL 402 for describing the URL 402 as a set of key-value pairs. For example, a typical key-value pair 404 has a key 406 and a corresponding value 408. According to this example, the URL 402 can be decomposed into some generic URL components, e.g., a scheme 410, an authority 412, a path 414, and a query 416, although other components are also possible, with the components shown being merely non-limiting examples. The decomposition of the URL 402 can be based on a set of general delimiters such as ":", "/" and "?". Further, the components before the delimiter "?" may be referred to as the static part of the URL (including scheme 410, authority 412 and path 414) and the remainder following the "?" may be referred to as the dynamic part (e.g., query 416) of the URL. Each URL dynamic component can be further broken down into several subsections based on another set of delimiters such as "&" and "=". Using these criteria, URL 402 can be broken down and represented by a series of key-value pairs 418-432. Additional information regarding URL syntax in general is provided by Berners-Lee et al., "Uniform Resource Identifier (URI): Generic Syntax. RFC 3986", Internet Engineering Task Force (IETF), January 2005.

As illustrated in FIG. 4, a key-value pair 418 under scheme 410 includes "scheme" as the key and "http" as the value. Further, under authority 412, three key-value pairs may be created, with "auth_0" being the key for "com" in key-value pair 420, "auth_1" being the key for "example" in key-value pair 422, and "auth_2" being the key for "www" in key-value pair 424. Similarly, under path 414, two key-value pairs may be formed, with "path_0" being the key for "images" in key-value pair 426 and "path_1" being the key for "search" in key-value pair 428. Additionally, under query 416, two key-value pairs may be formed, with "q" being the key for "hp" in key-value pair 430, and "form" being the key for "bifd" in key-value pair 432. Thus, for the static part of URL 402, the keys are pre-defined by the corresponding components such as "auth_0" and "path_0", while for the dynamic part of URL 402, the keys are the tokens before the "=" delimiter.

Applying key-value pairs for construction of the pattern tree enables leveraging of the statistical information of the whole training set. In this way, the learning process does not suffer from random noises caused by individual duplicate pairs. Further, the pattern tree enables rules to be summarized directly based on the tree nodes. An additional function of the pattern tree can be to detect and resolve redundancies and conflicts in the rules. For example, the ancestor-descendant relationships between tree nodes can be used to identify redundant rules.

Learning Normalization Rules

Duplicate Clusters and Training Data Set. A duplicate cluster is a group of URLs having the same or very similar page content, referred to herein as "duplicate content". For example, the content of duplicate URLs is not always exactly identical, as the content sometimes can differ in insignificant ways, such as by having different counters, dates, advertisements and the like. Further, some URL parameters affect how pages are displayed, such as by affecting fonts, image sizes, etc., without altering the substantive content of the page. Thus, duplicate content may be content that matches in a substantive manner by being the same or closely similar. Further, a set of training data is a collection of duplicate clusters, for example, downloaded from a particular website targeted for crawling and indexing. Duplicate clusters may be numbered in sequence, denoted as $\{c_1, c_2, \ldots, c_n\}$ to distinguish different duplicates.

Figures 5A, 5B, 5C:
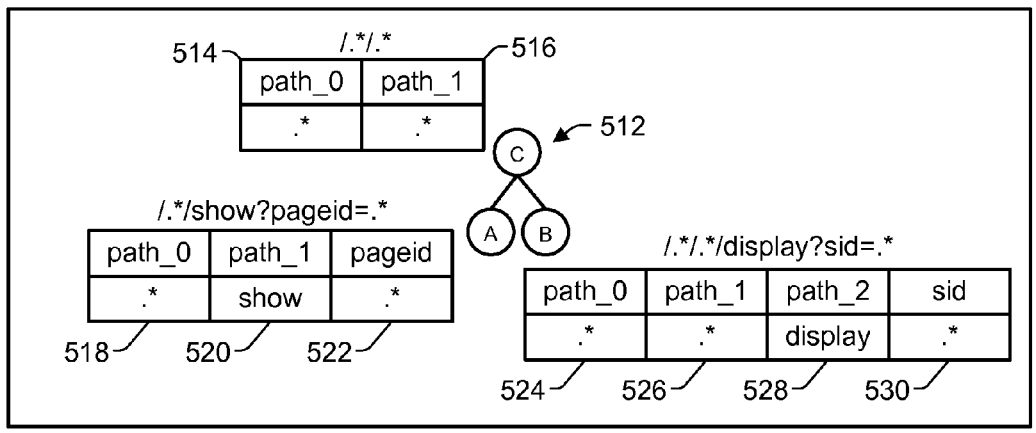
FIGS. 5A-5C illustrate an example of rule generation according to some implementations.

FIG. 5A illustrates a set of training data 502 having two different clusters $c_1$ 504 and $c_2$ 506 of duplicate URLs. A first group of URLs 508 included in the cluster $c_1$ 504 have been determined to refer to duplicate first content based on an examination of the corresponding content downloaded for each of these URLs.

Similarly, a second group of URLs 510 included in the cluster $c_2$ 506 have been determined to refer to duplicate second content based on an examination of the corresponding content downloaded for each of these URLs. As an example, a digital fingerprint can be generated for each webpage of content in the training data, and the fingerprints can be compared with one another for determining duplicate content. Other techniques for comparing content may also be applied.

URL Pattern and Pattern Tree. As described above with respect to FIG. 4, a URL pattern can also be described with a group of key-value pairs. Thus, the values can be regular expressions instead of concrete strings. A pattern tree can be constructed as a hierarchical structure where the pattern of a parent node can characterize all its children.

FIG. 5B illustrates a pattern tree 512 constructed based on the first group of URLs 508 and the group of URLs 510 in the training data 502 of FIG. 5A. In the pattern tree 512, nodes A and B are siblings and node C is the parent of nodes A and B. For each node A, B, C, both the key-value pairs and the regular expression of the corresponding URL pattern are illustrated. For example, node C includes two key-value pairs 514, 516, based on the expression "/.*/.*", node A includes three key-value pairs 518, 520, 522 based on the expression "/.*/show?pageid=.*" and node B includes four key-value pairs 524, 526, 528, 530 based on the expression "/.*/.*/display?sid=.*".

Rewrite Operation and Normalization Rule. FIG. 5C illustrates a normalization rule 532 which converts URLs of the source pattern of node A (/.*/show?pageid=.*) to the canonical format of the target pattern of node B. A normalization rule encompasses a set of rewrite operations for every URL key. In the illustrated example, the normalization rule lists operations 1-4 for target keys 534, with a type of operation 536 and description 538. Each rewrite operation 1-4 works on one target key 534 and the value in the description 538 is set accordingly. There are three possible types of operations defined in implementations herein: ignore, replace and keep.

The ignore operation acts to generalize the values on the target key to the wildcard "*", as this value does not affect the page content. Such a key may also be referred to as an "irrelevant path component". Mirror versions of URLs and session ids are typical examples of this case, as shown with rewrite operations 1 and 4 in FIG. 5C.

The replace operation acts to set the value of the target key to the value of the source key. For example, in rewrite operation 2 in FIG. 5C the value of the key "path_1" of node B is set according to the value of the key "pageid" of node A, i.e., value($K^B_{path\_1}$)=value ($K^A_{pageid}$)

The keep operation acts to retain the original value of the target key. For example, the value "display" of the target key "path_2" of node B does not change in the 3rd operation.

Compression rate, dup-reduction rate, and false-positive rate are measurements and parameters that can be used to evaluate the de-duplication performance. The compression rate and dup-reduction rate are defined as follows:

$$\text{compression rate} = 1 - \frac{N_{norm}}{N_{ori}} \quad (1)$$

$$\text{dup-reduction rate} = 1 - \frac{1 - C_{norm}/N_{norm}}{1 - C_{ori}/N_{ori}} \quad (2)$$

where $N_{ori}$ and $N_{norm}$ are the number of URLs before and after the normalization, respectively. Supposing there are $C_{ori}$ duplicate clusters in the $N_{ori}$ URLs, the original duplicate rate is $1-C_{ori}/N_{ori}$. After the normalization, supposing there are $C_{norm}$ clusters, the new duplicate rate is $1-C_{norm}/N_{norm}$.

Additionally, in normalization, it is still possible that two non-duplicate URLs may be mistakenly rewritten to the same canonical format. Such two URLs are referred to as a "false-positive pair". By contrast, any two URLs that are normalized to the same URL are referred to as "a support pair". The false-positive rate (fpr) measures the accuracy of the normalization (either by one rule or a set of rules), as follows:

$$fpr = \frac{N_{fpp}}{N_{supp}} \quad (3)$$

where $N_{fpp}$ and $N_{supp}$ are the numbers of false-positive pairs and support pairs in the normalization, respectively. Implementations herein, as discussed below, provide for identification and removal of false positives.

Framework for Learning URL Normalization Rules

Figure 6:
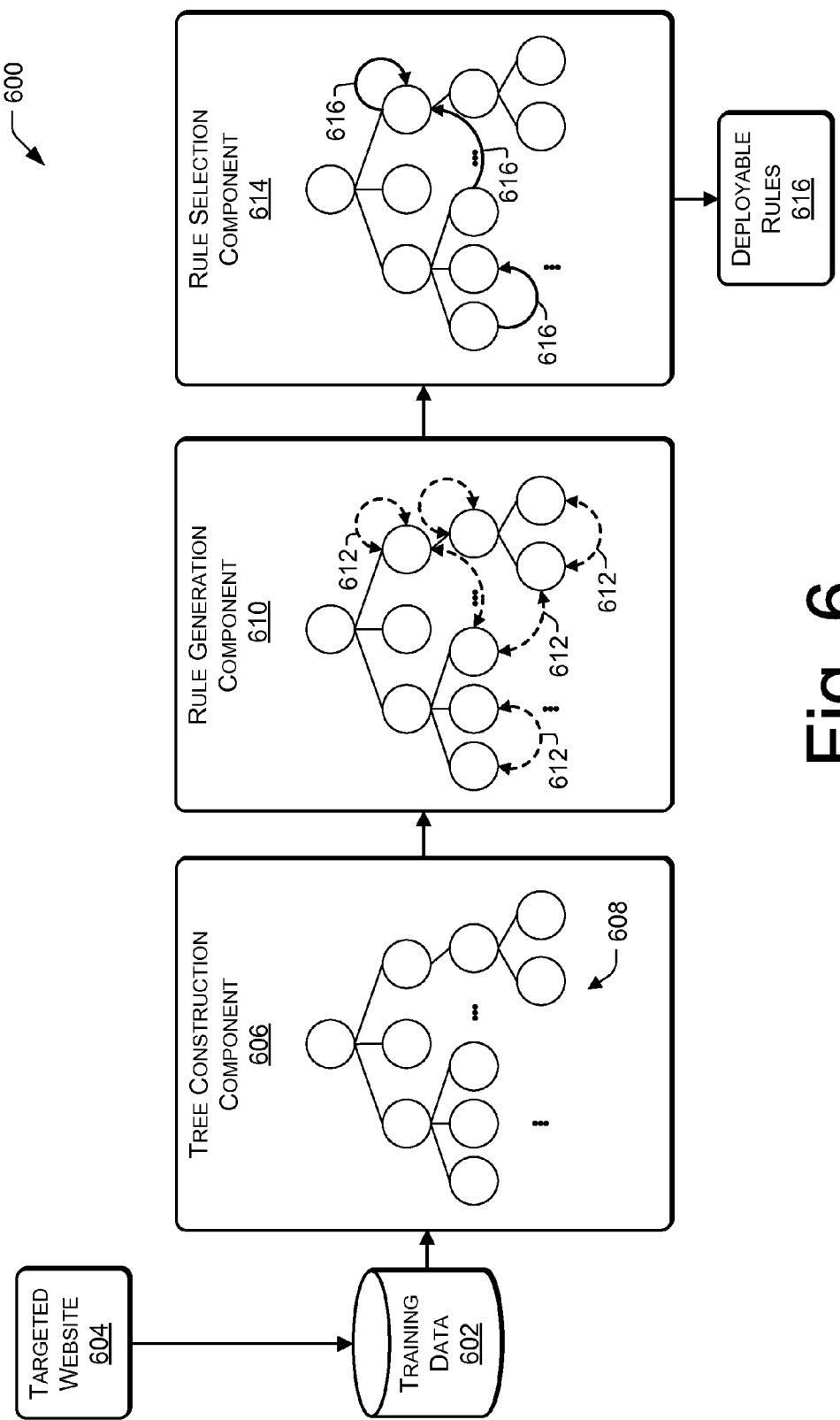
FIG. 6 is a block diagram of a framework for URL normalization according to some implementations.

FIG. 6 illustrates a block diagram of a framework 600 for learning URL normalization rules according to some implementations herein. Framework 600 operates using a set of training data 602 collected from the targeted website 604. The training data 602 is processed by tree construction component 604 to create a pattern tree 608 based on the hierarchical organization of the training data 602 downloaded from the website 604. As mentioned previously, pattern tree 608 is able to fully leverage the statistical information of the whole set of training data 602 and help summarize duplicate URL patterns. Given a collection of training samples (i.e. URLs) in the training data 602 collected from the website 604, the tree construction component 606 is able to construct a pattern tree based on the analysis of URL syntax structures, as discussed above with reference to FIGS. 3-5. Each URL in the training data 602 is first decomposed into a group of key-value pairs, as discussed with reference to FIG. 4. The distribution of values under each key is then evaluated, based on which the pattern tree is constructed through an iterative splitting process. Starting from the root node, which contains all the training samples, members of a node are split into subgroups according to the key whose value distribution has the smallest "entropy" (i.e., the smallest number of values compared to the total URLs in a particular iteration, as described additionally below). In this way, each node on the pattern tree has a set of member URLs, and the members of the parent node are the union of members of all its child nodes.

Based on the constructed pattern tree, a rule generation component 610 can estimate how the duplicate URLs are distributed on the tree nodes. For example, if there is a first node whose member URLs are highly duplicated with the members of a second node, then a normalization rule 612 can be generated to transform the URLs from one node to the other node. The rule generation component 610 according to implementations herein utilizes an inverted index-like structure to identify possible duplicate nodes with linear time complexity. After that, for every two duplicate nodes identified, rule generation component 610 generates one candidate rule 612 in which the rewrite operations are constructed by discovering the mapping relationships among the keys of the two nodes, as discussed above with reference to FIG. 5. Additionally, rule generation component 610 may execute a proofing to remove unqualified candidate rules 612 having a high false-positive rate. This is a desirable operations, as the learning process considers positive observations (i.e., where URLs are duplicates), but ignores negative observations (i.e., where URLs are not duplicated). As a result, some generated rules may be biased by the positive cases and may cause false alarms on the negative cases.

Following generation of candidate rules 612, a rule selection component 614 is used to select deployable rules 616 from qualified candidates 612. The goal of the rule selection component 614 is to identify an optimal subset of candidate rules to balance the de-duplication capability and runtime stability, which theoretically can be an NP-hard problem. However, implementations of the rule selection component 614 herein may use a graph-based method to incorporate both the popularity of a single tree node and the link relationships generated by the normalization rules. The selected deployable rules 616 may then be provided for use by a search engine during crawling and indexing of the targeted website 604. By using the deployable rules 616, for example, duplicate URLs are able to be identified and normalized in advance so that unnecessary processing, downloading and indexing of duplicate content is avoided.

Pattern Tree Construction

Implementations herein provide practical and efficient techniques for constructing a pattern tree for URLs. The inventors herein have determined that different URL components (or keys) usually have different functions and play different roles in a website. For instance, keys denoting directories, functions, and document types typically have only a few values, which may be explicitly recorded by the pattern tree. By contrast, keys denoting parameters such as user names and product IDs typically have quite diverse values, which may be generalized in the pattern tree. According to these observations, implementations herein can utilize a topdown recursive split process that groups URLs having a common pattern or syntax structure into the same node. The following provides an example of instructions carried out by the tree construction component for determining a node t for a pattern tree based on a set of training data of a current group of URLs U and a set of keys $K_{done}$, that have already been selected:

```
0: Start BuildPatternTree
1: Create a new node t
2: Generate a regular expression for t to describe URLs in U
3: Calculate entropy H(k) for each key in U
4: if ∃k ∉ K_done then
5:      Let k* ∉ K_done be the key that minimizes H(k)
6:      V_k* = ∅
7:      for all URL u ∈ U do
8:          if u(k*) is a trivial value then
9:              V_k* = (V_k* ∪ '*')
10:         else
11:             V_k* = (V_k* ∪ u(k*))
12:         end if
13:     end for
14:     if all u(k*) are trivial values then
15:         return the node t
16:     end if
17:     Split U into subgroups U_1, ... , U_t according to V_k*
18:     for all subgroups U_i do
19:         ch = BuildPatternTree(U_i, K_done ∪ { k*})
20:         add ch to t as a child node
21:     end for
22: end if
23: return the node t
```

Starting at the root node (which contains all the URLs in the training set), the tree and sub-trees are constructed by continually splitting the URLs into subgroups using recursive processing. Two criteria may be followed: (1) in each iteration, the key with the fewest values is selected, and based on this, the URLs are split into subgroups; and (2) an iteration is stopped and a tree node is generated when the values of the selected key seldom appear in other URLs.

The first criterion describes the value distribution of a given key k in the form of entropy $H_k$, as follows:

$$H_k = \sum_{i=1}^{V} -\frac{v_i}{N} \log \frac{v_i}{N} \quad (4)$$

where V is the number of values under this key, $v_i$ is the frequency of the ith value, and N is the number of total URLs in this iteration. In each iteration, the key with the smallest entropy is chosen, and the URLs are split into subgroups according to the values of the selected key.

The second criterion is used to decide whether the current iteration can be stopped. As general patterns and a clean tree are easier to use, values determined to be salient values are maintained in the patterns and values determined to be trivial values are replaced with regular expressions. Whether a value is salient or trivial may be determined based on the statistics for the distribution of the frequencies for the values.

Figure 7:
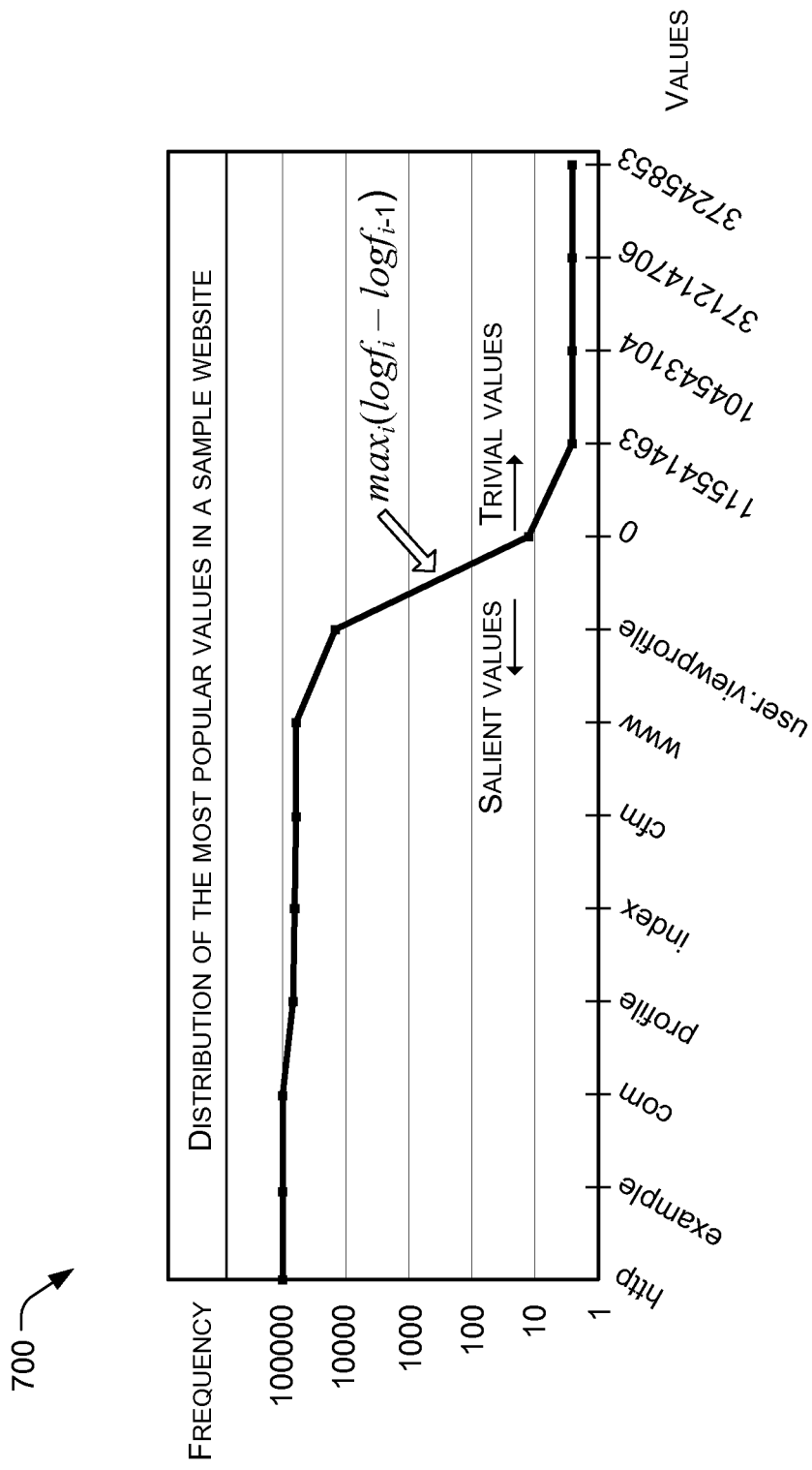
FIG. 7 illustrates an example of a distribution of popular values in a sample website.

FIG. 7 illustrates an example of a distribution 700 of the most popular values from a particular sample website showing the most popular values extracted from 100,000 URLs of the website. From the example of FIG. 7, it can be seen that there is a distinct decline of the frequency curve. Values before the decline such as "index" and "cfm" are referred to herein as salient values, while values after the decline are referred to as trivial values. In implementations herein, values are sorted in descending order according to their frequencies, and the position of the decline $pos_{decline}$ is determined by finding the maximal drop rate on the frequency curve, as follows:

$$pos_{decline} = \max_i(\log f_i - \log f_{i-1}) \quad (5)$$

where $f_i$ is the appearance frequency of the ith value. Thus, implementations are able to use the determination of whether a value is salient or trivial for deciding when to cease a recursive iteration and generate a node of the tree.

Candidate Rules Generation

As discussed previously, candidate rules may be generated based on the presence of duplicate nodes in the pattern tree. For every two duplicate nodes identified, one raw candidate rule may be created by constructing the corresponding rewrite operations, as discussed above with reference to FIG. 5. Subsequently, a proofing operation is conducted to remove unqualified candidate rules with high false-positive rates.

Identifying Possible Duplicate Nodes

Duplicate nodes on the pattern tree are pairs of two nodes sharing enough common duplicate URLs. To assess the duplicate ratio of two nodes s and t, some implementations define a quantitative measurement referred to as "overlap". For instance, a duplicate cluster $c_i$ in the training set is common to s and t, if $s \cap c_i \neq \emptyset$ and $t \cap c_i \neq \emptyset$. If these conditions are met, the overlap of s and t is defined based on all their common clusters $c_i$, as $$\text{overlap}(s, t) = \frac{\Sigma_{c_i} |\{u \mid u \in c_i \text{ and } (u \in s \text{ or } u \in t)\}|}{|s| + |t|} \quad (6)$$

The overlap reflects how many common duplicates there are between nodes s and t. Thus, a large overlap provides more confidence that there exists a rule between the nodes s and t. In addition, there can be a special case in which the two duplicate nodes are the same, i.e., s=t. For such a case the duplicate rate $1 - C_{norm}/N_{norm}$ defined above can be used in place of the overlap (since overlap(s, s)=1) to ensure that the node s still covers enough duplicates.

Based on the definition provided by equation (6), to locate possible duplicate nodes, a straightforward technique is to check every pair of nodes on the pattern tree. The time cost is $O(cm^2)$, where m is the number of tree nodes and c is the average number of duplicate clusters in each node. Although the cost is much cheaper than checking original pairs of duplicate URLs, it may still be time consuming when a pattern tree has a large number of nodes. In practice, it has been seen that most tree node pairs do not have any common duplicates. This enables a shortcut technique based on an inverted index-like structure.

An example of instructions using an inverted index for identifying possible duplicate nodes D in the URL pattern tree T is set forth below. The instructions are based on receiving an input of the pattern-tree T and all duplicate clusters $c_1$, $c_2$, ..., $c_n$.

```
0: Begin IdentifyDuplicateNodes
1: (D) = ∅
2: Initialize an empty index list (L)
3: for all duplicate clusters c_i do
4:     (L)(c_i) = {t | t ∈ T; t ∩ c_i ≠ ∅}
5: end for
6: for all duplicate clusters c_i do
7:     for all (s,t) ∈ (L)(c_i) x (L)(c_i) do
8:         if (s,t) has already been checked then
9:             continue
10:        end if
11:        if overlap(s,t) ≥ o_min then
12:            (D) = (D) ∪ {(s,t)}
13:        end if
14:    end for
15: end for
16: return (D)
```

In the example instructions above, entries of the index structure are duplicate clusters, and the members of each entry are the tree nodes having the corresponding duplicate cluster. With this index structure, for a tree node s, it is possible to identify all the nodes which share at least one common duplicate cluster with the node s in linear time. In this way, the time cost decreases to O(cm). Additionally, to reduce the efforts of the later steps, implementations herein utilize a threshold $o_{min}$ to prune those duplicate nodes with overlap scores below the threshold $o_{min}$. In practice, $o_{min}$ may be empirically set to 0.5 or a similar value based on experimental data.

Constructing Rewrite Operations

When two nodes s and t are identified as sharing a large portion of duplicate URLs, the generation of a normalization rule s=>t includes the creation a series of rewrite operations for every URL key to transform the URL pattern of the node s to the format of the node t. To determine the proper operations and their types (i.e., keep/replace/ignore), the mapping relationship from the keys of s to the keys of t may be utilized. For example, there is a mapping relationship between two keys if the two keys have very similar value distributions. Keys in which a mapping relationship exists will likely trigger a "replace" operation, while keys without any mapping relationship between them are more likely to use operations of "ignore" or "keep". The following provides an example of instructions for finding a set of key-to-key mappings M based on two duplicate nodes (s,t).

```
0: Begin Key-Key Mapping
1: M = ∅
2: σ(k, k') = rate of common values shared by k and k'
3: Let K(s), K(t) be the sets of keys in (s, t)
4: for all k' ∈ K(t) do
5:     Let k ∈ K(s) be the key that maximizes σ(k, k')
6:     if σ(k, k') > σ_min then
7:         M = M ∪ {(k, k')}
8:     end if
9: end for
10: return M
```

The example instructions set forth above provide pseudo code for discovering mapping relationships between keys of two nodes. These instructions estimate the rate of common values shared by two keys and adopt a threshold $\sigma_{min}$ to filter out mappings having lower possibilities. In some implementations, $\sigma_{min}$ may be empirically set to 0.5 or similar value based on experimental data. Using the discovered key-to-key mapping relationships, the rewrite operations for the keys in the target node t may be determined as follows.

The keep operation may be used if one key from the target node t has only one concrete value (i.e., not a regular expression), such as the key "path_2" of node B in FIG. 5B. In FIG. 5B, the key "path_2" has one value "display", and thus, one keep operation is created for this key associated with the particular value. In normalization, it is possible to directly fill the key with the related value, as shown in rewrite operation 3 in FIG. 5C.

The replace operation is based on a key-to-key mapping between s and t. In general, two keys in such a mapping relationship have the same function (e.g., denoting a product-ID, search query, etc.). Different values of these keys typically lead to different page content. For example, in FIG. 5B, the key "pageid" of node A and the key "path_1" of node B both describe the id of the page to be shown/displayed. These two keys have the same values, such as "10" and "21", and maybe identified as a key-to-key mapping using the Key-Key Mapping instructions set forth above. Consequentially, in FIG. 5C, a replace operation is created for the key "path_1" associated with the mapping key "pageid" from the source pattern as rewrite operation 2. In normalization, the value of the source key (e.g., "pageid") may be copied to the target key (e.g., "path_1").

Use of the ignore operation indicates that the values under a key do not affect (or are irrelevant to) the page content. There typically may be two situations that result in an ignore operation: first, for a key of the target node t, an ignore operation is used when the key has multiple values (denoted by the wildcard character) but no mapping relationship. No mapping relationship means that the values of this key never appear in the source node s, which suggests the key is irrelevant to the page content. For example, the key "sid" of node B in FIG. 5B is ignored as its values (i.e., session ids) never appear in the URLs from node A, and the values have nothing to do with the page content.

The second situation for use of the ignore operation is to revise a replace operation. For instance, having a mapping relationship is just one precondition, but not always a sufficient condition, to create a replace operation. In other words, a replace operation may rely on a mapping relationship, but not all mapping relationships will lead to use of replace operations. For example, in FIG. 5, the two "path_0" keys from node A and node B share the same values (e.g., archive0 and archive3, respectively), and can pass the criterion in the Key-Key Mapping instructions set forth above to establish a mapping relationship. However, the values under these keys are actually used to describe the archive mirrors and have no impact on the page content. To identify such a "false" replace, a test process may be included to examine whether a key's values affect the page content. Consequently, when too many URLs (e.g., a predetermined threshold) having different values under this key are duplicates, the replace operation may be revised to an ignore operation accordingly.

Removing Unqualified Candidates

When generating a candidate rule, duplicate samples from the two duplicate nodes s and t are taken into account. From the perspective of learning, just the positive cases are observed, but negative cases (i.e., non-duplicate URLs being rewritten to the same canonical format) are missed. Therefore, it is likely to produce "over fitting" rules which work properly on just a few positive samples, but which do not properly apply to other URLs in the website. In other words, such an unqualified rule will lead to many false-positive cases in practice, resulting in URLs being normalized when they should not be. Accordingly, some implementations herein examine each generated candidate rule by testing the rule on the training set. If the false-positive rate is larger than a pre-defined threshold $fpr_{max}$, the rule is unqualified and is removed from the candidate set. In some implementations a suitable value for $fpr_{max}$ may be between 0.01 and 0.1, based on experimental results.

Deployable Rules Selection

As discussed previously, it often may not be desirable to directly deploy the candidate rules, as some of the candidate rules may be redundant or may conflict with each other. The presence of redundant rules can degrade the computational efficiency and the presence of conflicts can undermine performance or even result in a system crash.

Figure 8C:
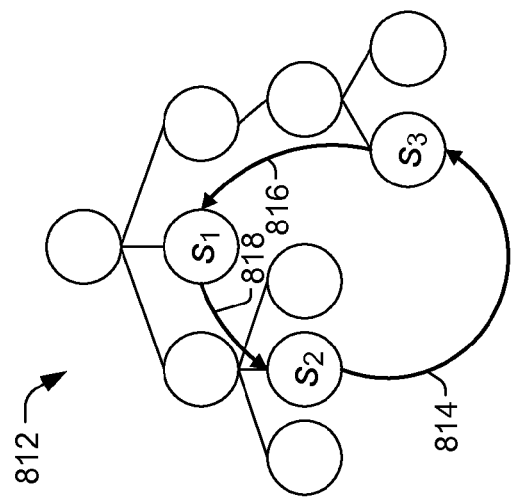
FIGS. 8A-8C illustrate examples of rule redundancies and conflicts.
Figure 8B:
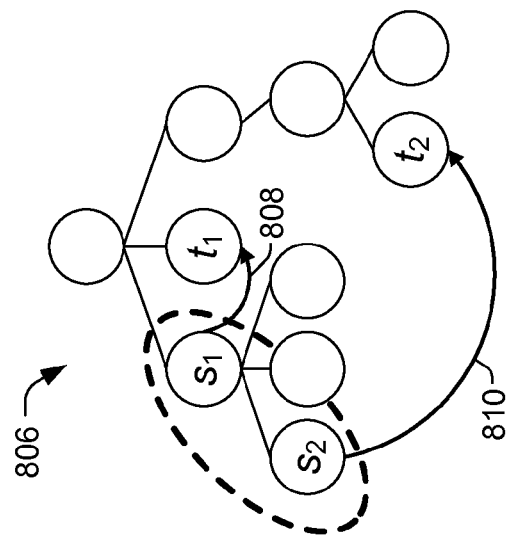
Figure 8A:
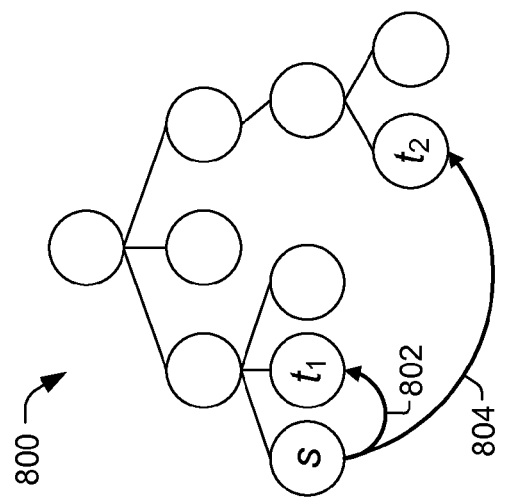

FIGS. 8A-8C illustrate several examples of redundant or conflicting rules for discussion purposes. FIG. 8A illustrates a redundant rule situation 800 in which two rules share the same source node. As shown in FIG. 8A, there are two rules 802, 804 which transform node s to nodes $t_1$ and $t_2$, respectively. This is redundant because in practice one canonical form is desired for a URL. Moreover, two redundant transformations cause additional computational burden on the normalization system. Accordingly, elimination of one of these rules 802, 804 is desirable.

FIG. 8B illustrates another redundant rule situation 806 in which one rule 808 covers another rule 810. As shown in FIG. 8B, node $s_1$ is the ancestor of node $s_2$, which means the pattern of $s_1$ is more general than that of $s_2$. Consequently, URLs belonging to $s_2$ can also be normalized by the rule acting on $s_1$. Similar to the first case discussed above, if not corrected this situation can lead to multiple canonical targets ($t_1$ and $t_2$) and unnecessary computing work.

FIG. 8C illustrates a conflicting rule situation 812 in which several rules 814, 816, 818 construct a circle. As shown in FIG. 8C, the nodes $s_1$, $s_2$, $s_3$ are connected by three rules 814-818 where the source of one rule is the target of another rule. Such a conflict may lead to an endless loop in computing and possibly cause a system crash.

The selection of an optimal subset of rules for deployment is not a trivial task for optimal running stability and de-duplication capability. One straightforward solution can be to remove the redundant and conflicting rules with some ad-hoc strategies. For example, in situation 800, a solution would be to keep just one rule. Accordingly, the rule with the smallest false-positive rate may be preserved and the other rule is discarded. Furthermore, in situation 806, a solution would be to keep the rule acting on the ancestor node and discard the rule acting on the descendant node, or, alternatively apply the rule with the smaller false-positive rate. Additionally, in situation 812 a solution would be to remove the rule with minimum support to break the circle. Here, the support is defined as the number of URLs that are able to be normalized by the rule.

Such empirical solutions may ensure system stability, but do not guarantee de-duplication performance. Essentially, the above straightforward approaches are designed from a local perspective and merely address the rules in conflict. However, an additional goal of the URL normalization herein is determining how to select the canonical formats (i.e. choosing nodes as desirable destinations of the normalization), rather than merely determining which rules have higher qualities. Consequently, a desirable destination node may be both "general" and "popular". Being "general" indicates that a node has a clean format and can represent a variety of samples. Therefore, the number of URLs covered by a node (referred to as the "volume" of a node) can be used to approximate the generality of the node. In other words, the larger the number of URLs covered by the node, the more general the node. Further, being "popular" means that a node attracts a greater number of other nodes to be transformed to its format. Selecting popular nodes as destinations can maximize the compression performance of the URL normalization process. To estimate the popularity of a node, implementations herein accumulate the volumes of all the nodes which can be normalized to the given node according to some candidate rules. In this way, it is possible to treat the volume of a node as a kind of energy, which can flow to other nodes through some normalization rules. Besides the candidate rules, links from descendant nodes to their ancestors provide another way for energy transfer, since a descendant can always be "normalized" to its ancestors. When the flow of energy reaches a stable status, nodes with higher energy may be selected as the destination nodes.

A weighted directed graph G=<V, E, w>, may be used to accomplish the foregoing, where V is the set of vertices, E is the set of edges, and w is the weight. One vertex $v_i$ represents one tree node appearing in the candidate rules. Consequently, there exists an edge $e_{ij} \epsilon E$ if there is a rule or a descendant-ancestor link from $v_i$ to $v_j$. The weight $w_{ij}$ of the edge $e_{ij}$ is set to $1-fpr_{ij}$ if the edge is constructed based on a rule $r_{ij}$; otherwise $w_{ij}$ may be simply set as 1 for a descendant-ancestor link. In this way, a natural random walk can be derived on the graph with the transition probability matrix P={p(i,j)} defined by:

$$p(i, j) = \frac{w_{ij}}{\text{outdegree}(v_i)} \quad (7)$$

for all edges $e_{ij} \epsilon E$, and 0 otherwise. Then each row of P is normalized to $\Sigma_j p(i,j)=1$. Given the initial distribution $\pi^0 = (\pi_0^0, \ldots \pi_n^0)^T$ where $\pi_i^0$=volumn($v_i$), the final stable distribution can be estimated by $\pi^{stable}=(P^T)^\infty \pi^0$.

FIGS. 9A-9E illustrate the selection of deployable rules from candidate rules on a pattern tree. As discussed above, the technique of FIGS. 9A-9E includes constructing a graph with candidate rules and descendant-ancestor links, selecting the nodes with the largest popularity as targets, and removing edges starting from these nodes. For instance, once the desired destination nodes have been determined based on popularity, removing redundant and conflicting rules becomes relatively easy.

Figure 9A:
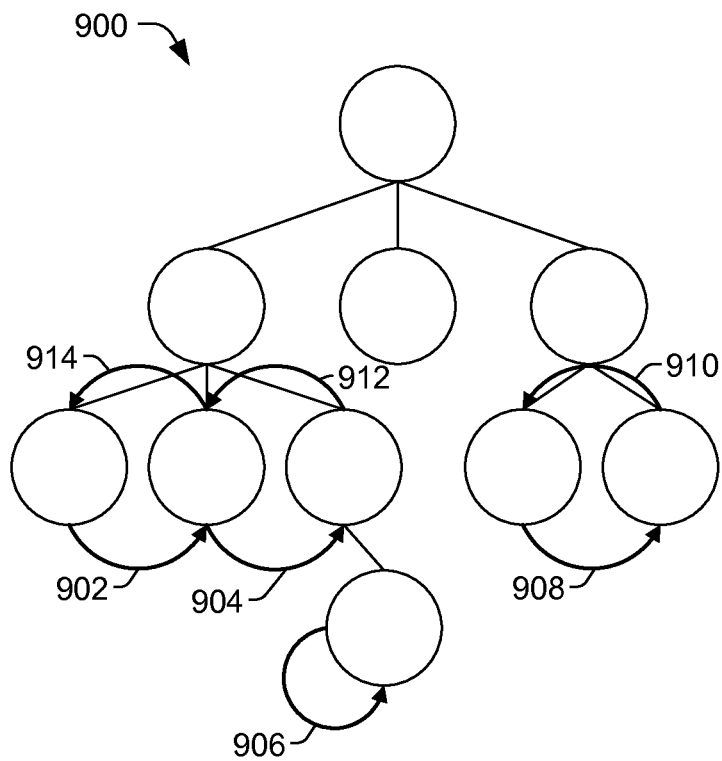
FIGS. 9A-9E illustrate selection of deployable rules according to some implementations.
Figure 9B:
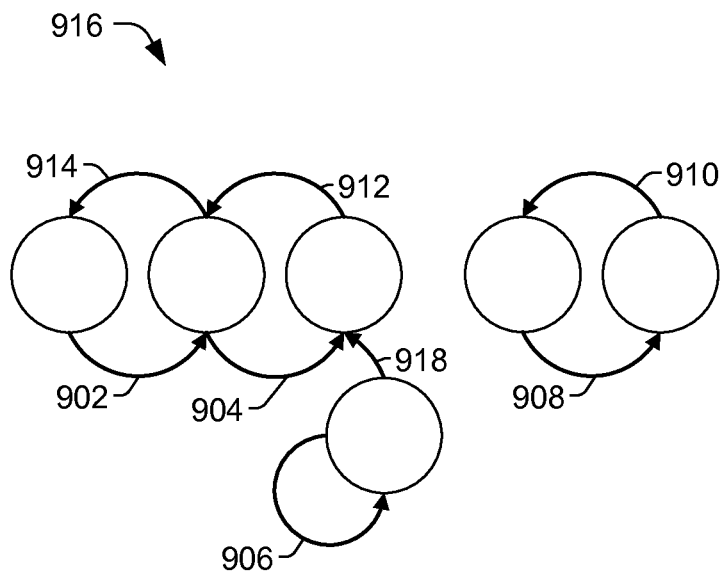

FIG. 9A illustrates a pattern tree 900 having several candidate rules 902-914, from which it is possible to determine typical redundant and conflict cases as discussed above with reference to FIG. 8. FIG. 9B illustrates how the nodes are connected to construct a graph 916. As illustrated, the nodes not affected by rules are removed to create the graph 916, and descendent-ancestor links, such as link 918, may be added for any orphaned descendant-ancestor nodes having rules associated.

Figure 9C:
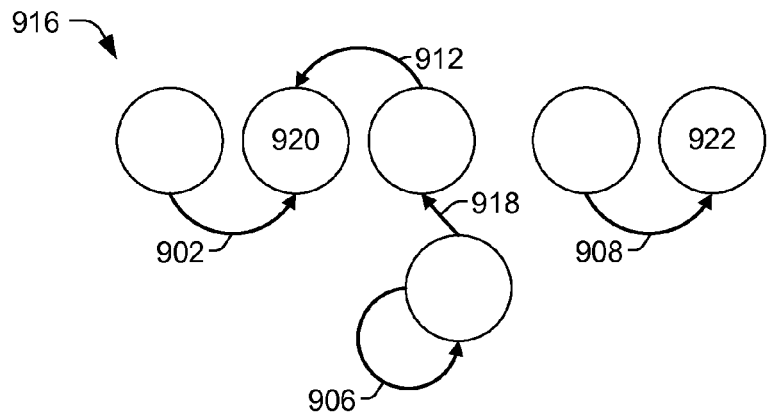

In FIG. 9C destination nodes are selected based on the popularity determined for these nodes, as described above. In the illustrated example, nodes 920 and 922 are selected as destination nodes based on popularity. Then, those rules 904, 910, 914 which start from the destination nodes 920, 922 may be removed from the graph 916.

Figure 9D:
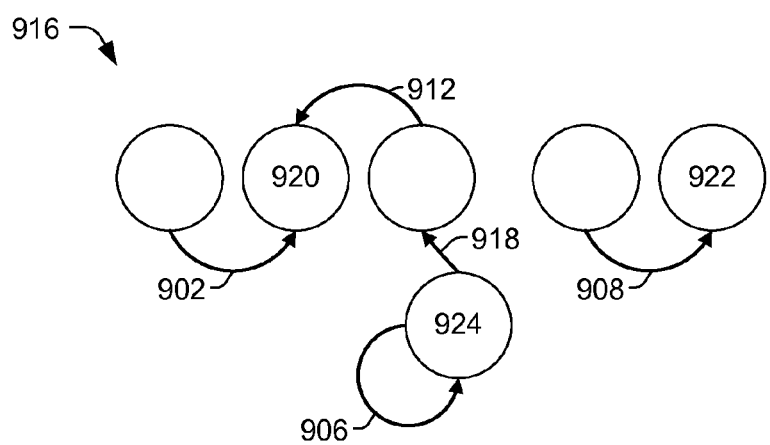
Figure 9E:
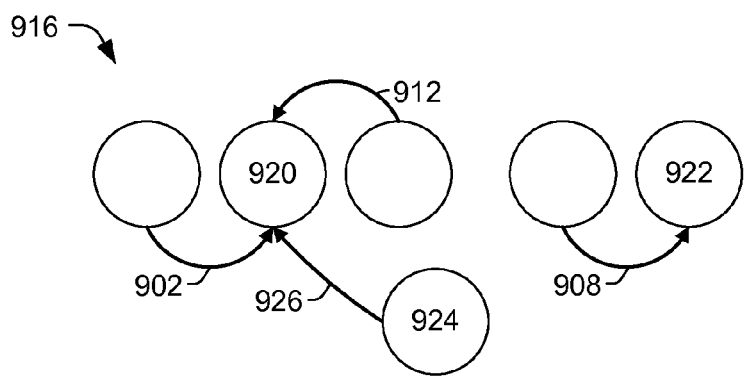

At FIG. 9D, it is noted that the transition from node 924 to 920 involves three rules 906, 918, 912. As illustrated at FIG. 9E, these three rules 906, 918, 912 can be concatenated by chaining these rules together to generate one direct rule 926 from node 924 to node 920, which will improve the efficiency of the normalization process. Accordingly, the remaining rules 902, 908, 912 and 926 are the selected deployable rules, which may be deployed for use by the search engine during crawling and indexing of the targeted website.

Figure 10:
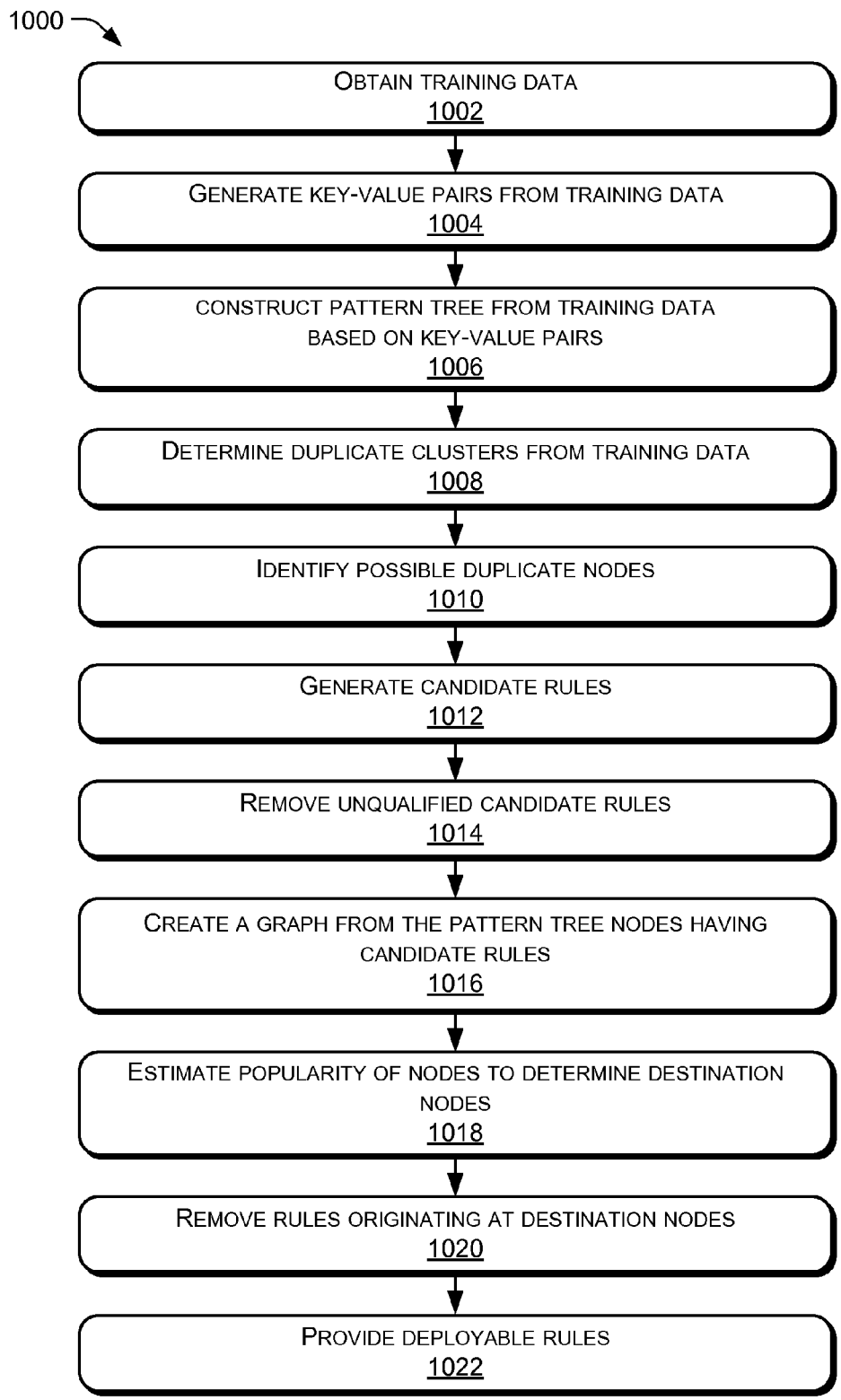
FIG. 10 is a flow diagram of an example of a process for determining normalization rules according to some implementations

FIG. 10 illustrates a flow diagram of an example of a process 1000 for URL normalization according to implementations herein. In the flow diagram, the operations are summarized in individual blocks. The operations may be performed in hardware, or as processor-executable instructions (software or firmware) that may be executed by one or more processors. Further, the process 1000 may, but need not necessarily, be implemented using the framework of FIG. 6. Consequently, by way of explanation, and not limitation, the process 1000 is described in the context of the framework of FIG. 6.

At block 1002, a set of training data is obtained from a targeted website. For example, as discussed previously, the training data may include a sample of URLs and corresponding content downloaded from the targeted website. In some implementations, this training data may be downloaded by a web crawler prior to crawling of the targeted website.

At block 1004, the URLs in the training data are broken down into key-value pairs. For example, as discussed above with reference to FIGS. 4 and 5, multiple key-value pairs may be generated for each URL in the training data.

At block 1006, a pattern tree is constructed from the training set of URLs and the keys of the key-value pairs. As discussed above, building a pattern tree can include a calculation of entropy for each key in the group of URLs U for determining a key having the lowest entropy, which is then used to form a node of the tree. In some examples herein, recursive processing is used to divide the group of URLs into subgroups for determining the nodes of the tree.

At block 1008, clusters of URLs having the same of closely similar content are determined from the training data. For example, as discussed above with reference to FIG. 5A, a plurality of clusters $c_1, c_2, \ldots, c_n$ are determined from the training data by examining the downloaded content corresponding to each URL for distinguishing different duplicate groups of URLs.

At block 1010, possible duplicate nodes are identified based on the pattern tree and the identified duplicate clusters. As described above, determining possible duplicate nodes may include initializing an inverted index structure where entries of the index structure are duplicate clusters and the members of each entry are the tree nodes having the corresponding duplicate cluster.

At block 1012, candidate rules are generated based on the identified duplicate nodes. For example, rewrite operations can be generated for URL keys of the nodes identified as being duplicate nodes. In these implementations, key-to-key mapping relationships between keys of the identified nodes can be determined for identifying particular rewrite operations which may be used for creating a normalization rule between the two nodes.

At block 1014, unqualified candidate rules are removed. For example, a false positive rate is determined for the generated candidate rules. By testing the candidate rules on the training data, those rules whose false positive rates do not satisfy a predefined threshold are removed from the candidate rule set.

At block 1016, a graph is created from the pattern tree nodes having rules associated therewith. For example, as described with respect to FIGS. 9A-9E, a directed graph is constructed from the pattern tree based on the nodes associated with candidate rules.

At block 1018, the popularity of the nodes in the graph is estimated to determine which nodes to select as the destination nodes. For example, as described with respect to FIGS. 9A-9E, nodes having the greatest estimated popularity are designated as destination nodes.

At block 1020, rules originating at the destination nodes are removed from the graph. Additionally, any rules that form chains of multiple rules through multiple nodes may be concatenated into a single direct rule.

At block 1022, the rules remaining in the graph are the selected deployable rules resulting from the training data. For example, the selected rules may be used by the web crawler during crawling and interaction with the targeted website from which the training data was obtained. The rules can be used to normalize duplicate URLs in advance and thereby avoid wasted resources such as would be caused by downloading duplicate content based on duplicate URLs. Further, the rules may also be used during the indexing stage for creating a more accurate and compact index.

Example Architecture

Figure 11:
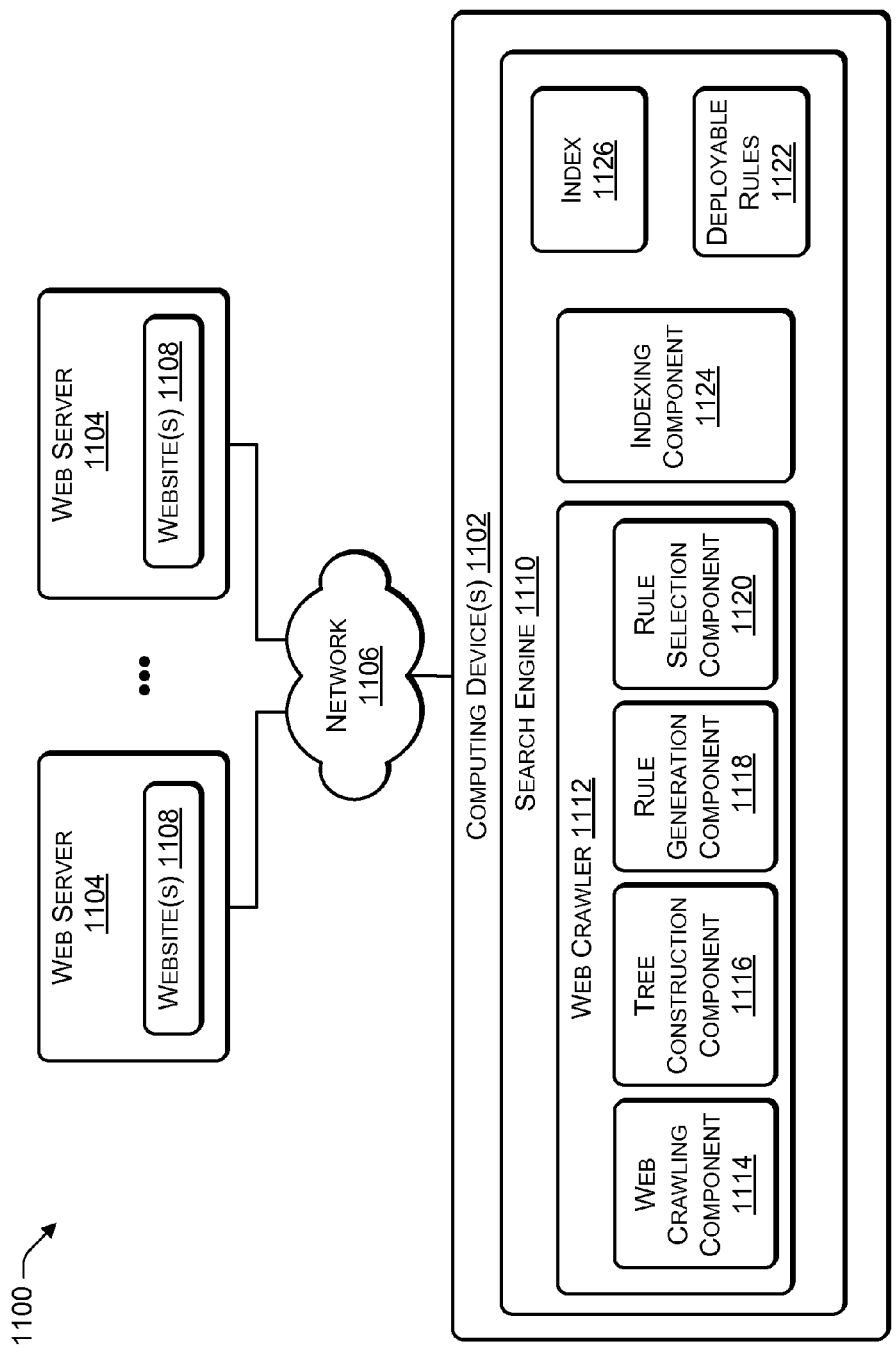
FIG. 11 is an example of a system architecture according to some implementations.

FIG. 11 illustrates a block diagram of an architecture 1100 for explanation purposes for describing implementations herein. In the illustrated example, architecture 1100 includes at least one computing device 1102 able to communicate with a plurality of web servers 1104 through a network 1106. For example, network 1106 may be the Internet or other suitable communication network enabling communication between computing device 1102 and web servers 1104. Each web server 1104 may host or provide one or more websites 1108 that may be targeted by a search engine 1110 on the computing device 1102. For example, search engine 1110 may include a web crawler 1112 for collecting information from each website 1108 for generating searchable information pertaining to the websites 1108. Web crawler 1112 includes a web crawling component 1114, a tree construction component 1116, a rule generation component 1118, and a rule selection component 1120. Tree construction component 1116, rule generation component 1118, and rule selection component 1120 may correspond to tree construction components 104, 606, rule generation components 106, 610, and rule selection components 108, 614, respectively, as described previously herein, for generating one or more deployable rules 1122 for use in URL normalization. Search engine 1110 may further include an indexing component 1124 for generating an index 1126 based on information collected by the web crawler 1112 from the websites 1108. As discussed above, indexing component 1124 may also make use of the deployable rules 1122 determined by the rule selection component 1120, such as for improving indexing efficiency and index structure.

Example Computing Device

Figure 12:
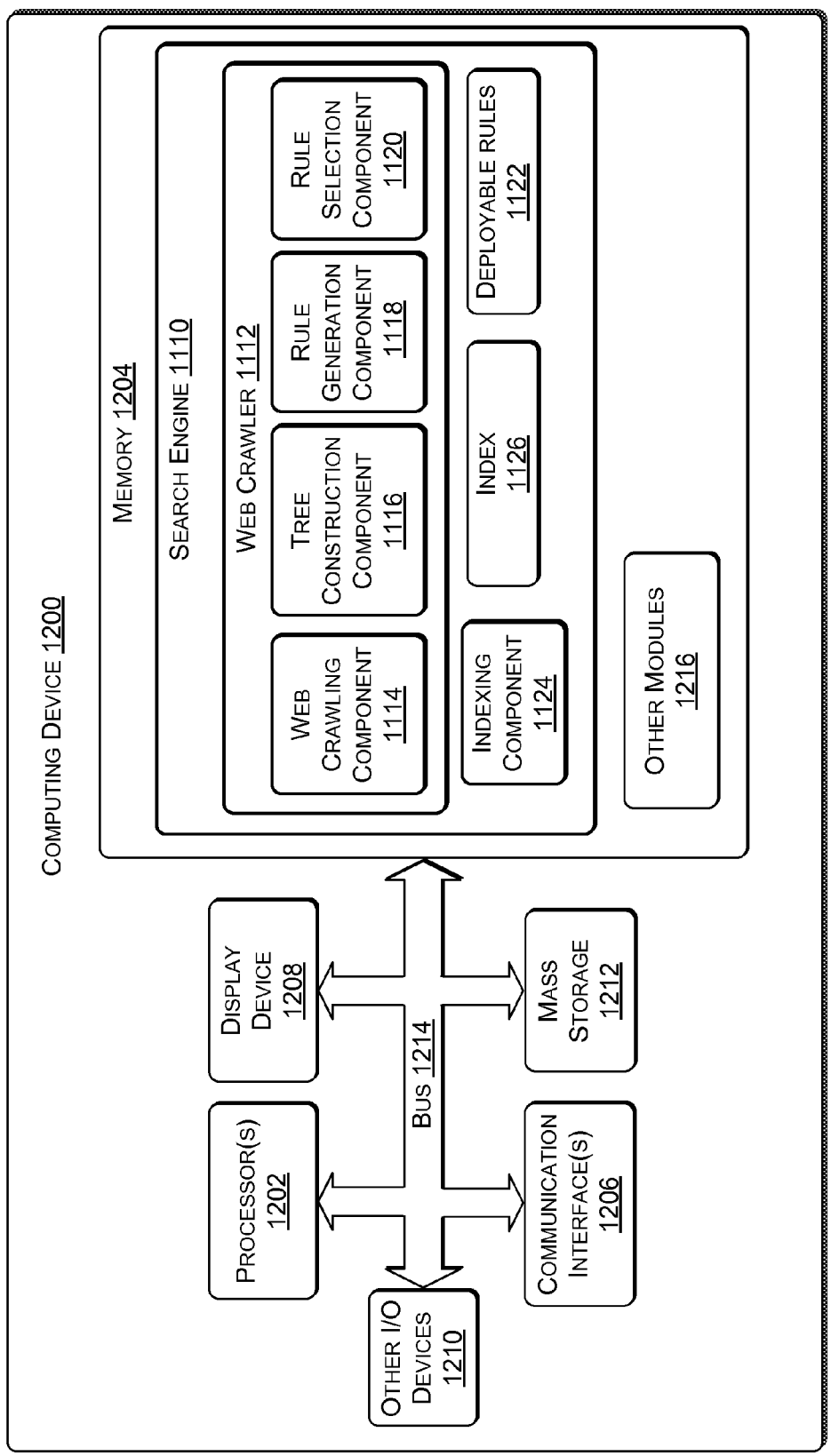
FIG. 12 is an example of a computing device according to some implementations.

FIG. 12 illustrates an example configuration of a computing device 1200 that can be used to implement the components and modules described herein. The computing device 1200 may include at least one processor 1202, a memory 1204, communication interfaces 1206, a display device 1208, other input/output (I/O) devices 1210, and one or more mass storage devices 1212 able to communicate with each other, such as via a system bus 1214 or other suitable connection.

The processor 1202 may be a single processing unit or a number of processing units, all of which may include single or multiple computing units or multiple cores. The processor 1202 can be implemented as one or more microprocessors, microcomputers, microcontrollers, digital signal processors, central processing units, state machines, logic circuitries, and/or any devices that manipulate signals based on operational instructions. Among other capabilities, the processor 1202 can be configured to fetch and execute computer-readable instructions or processor-accessible instructions stored in the memory 1204, mass storage devices 1212, or other computer-readable storage media.

Memory 1204 and mass storage devices 1212 are examples of computer-readable storage media for storing instructions which are executed by the processor 1202 to perform the various functions described above. For example, memory 1204 may generally include both volatile memory and non-volatile memory (e.g., RAM, ROM, or the like). Further, mass storage devices 1212 may generally include hard disk drives, solid-state drives, removable media, including external and removable drives, memory cards, Flash memory, floppy disks, optical disks (e.g., CD, DVD), or the like. Both memory 1204 and mass storage devices 1212 may be collectively referred to as memory or computer-readable storage media herein. Memory 1204 is capable of storing computer-readable, processor-executable program instructions as computer program code that can be executed by the processor 1202 as a particular machine configured for carrying out the operations and functions described in the implementations herein.

The computing device 1200 can also include one or more communication interfaces 1206 for exchanging data with other devices, such as via a network, direct connection, or the like, as discussed above. The communication interfaces 1206 can facilitate communications within a wide variety of networks and protocol types, including wired networks (e.g., LAN, cable, etc.) and wireless networks (e.g., WLAN, cellular, satellite, etc.), the Internet and the like. Communication interfaces 1206 can also provide communication with external storage (not shown), such as in a storage array, network attached storage, storage area network, or the like.

A display device 1208, such as a monitor may be included in some implementations for displaying information to users. Other I/O devices 1210 may be devices that receive various inputs from a user and provide various outputs to the user, and can include a keyboard, remote controller, a mouse, printer, audio input/output devices, and so forth.

Memory 1204 may include modules and components for performing rule generation and selection according to the implementations herein. In the illustrated example, memory 1204 includes the search engine 1110 described above that affords functionality for web crawling and indexing to provide search services to Internet users. For example, as discussed above, search engine 1110 includes web crawler 1112 having web crawling component 1114, tree construction component 1116, rule generation component 1118, and rule selection component 1120. Additionally, search engine 1110 also includes deployable rules 1122, indexing component 1144, and index 1026, as described above. Memory 1204 may also include one or more other modules 1216, such as an operating system, drivers, communication software, or the like. Further, while example system configurations and architectures have been described, other implementations are not limited to the particular system configurations and architectures described herein.

Example Environments

The implementations disclosed are not limited to the URL de-duplication examples discussed above, and can be applied in numerous other environments, applications and contexts. For instance, the pattern tree construction techniques described herein can be used to construct pattern trees of URLs for other uses. For example, a pattern tree can be constructed for a website using the techniques described above and used for logging and tracking a number of clicks received by particular URLs of the website. This information can be used for determining an importance or value of URLs in particular patterns. Additionally, the pattern tree techniques herein can be used in cataloging and indexing discussion forums, such as for generating patterns for threads or pages of online forums. For example, for saving storage space and improve search efficiency, a search engine can only index URLs from important patterns (like discussion threads in a web forum) and ignore URLs in other trivial patterns. Consequently, some implementations can be applied to data mining and cataloging, discussion forum indexing, social network indexing, and the like Further, the computing devices described herein are merely examples of suitable computing devices for some implementations and are not intended to suggest any limitation as to the scope of use or functionality of the architectures and frameworks that can implement the features described herein. Neither should the computing devices described be interpreted as having any dependency or requirement relating to any one or combination of the components illustrated in the implementations herein. Thus, implementations herein are operational with numerous general purpose and special-purpose computing systems, environments or configurations, or other devices having processing capability.

Additionally, the components and modules herein can be employed in many different environments and situations, and are not limited to use in a search engine. Generally, any of the functions described with reference to the figures can be implemented using software, hardware (e.g., fixed logic circuitry) or a combination of these implementations. The term "logic," "module," "mechanism" or "component" as used herein generally represents software, hardware, or a combination of software and hardware that can be configured to implement prescribed functions. For instance, in the case of a software implementation, the term "logic," "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer-readable storage devices. Thus, the methods and modules described herein may be implemented by a computer program product. The computer program product may include computer-readable media having a computer-readable program code embodied therein. The computer-readable program code may be adapted to be executed by one or more processors to implement the processes, components and/or modules of the implementations described herein. The terms "computer-readable media," "processor-accessible media," or the like, refer to any kind of non-transient machine-readable storage medium for retaining information, and can include the various kinds of storage devices discussed above.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described in connection with the implementations is included in at least one implementation, and the appearances of these phrases in various places in the specification are not necessarily all referring to the same implementation. Additionally, in the description, numerous specific details are set forth in order to provide a thorough disclosure. However, it will be apparent to one of ordinary skill in the art that these specific details may not all be utilized in all implementations. In other circumstances, well-known structures, materials, circuits, processes and interfaces have not been described in detail, and/or are illustrated in block diagram form, so as to not unnecessarily obscure the disclosure.

Conclusion

Implementations described herein provide for a pattern tree-based approach to learning URL normalization rules. Some implementations apply a global perspective and leverage the statistical information from an entire set of training data. Furthermore, the computational cost is also relatively low, since rules are directly induced on pattern trees, rather than on every duplicate URL pair. Moreover, a graph-based strategy may be applied for selecting a subset of deployable rules for use in URL normalization. Consequently, implementations herein are able to greatly reduce duplicates while producing few false-positives.

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method comprising:
obtaining a set of Uniform Resource Locators (URLs) and corresponding content from a targeted website;
decomposing each URL into a group of key-value pairs;
constructing, by a processor, a tree having a plurality of nodes, each node of the tree representing a group of URLs having a common pattern;
identifying one or more pairs of nodes corresponding to duplicate content in which a first node in a pair of nodes corresponds to first content that substantively matches second content corresponding to a second node in the pair of nodes;
generating a candidate rule for each of the one or more pairs of nodes, the candidate rule relating a URL of the first node to a URL of the second node; and
selecting one or more of the candidate rules as one or more deployable rules.

2. The method according to claim 1, the constructing the tree further comprising:
creating a root node for the URLs of the set of URLs;
choosing a particular key having a smallest distribution of values;
splitting the URLs into multiple subgroups according to the values of the particular key identified as having the smallest distribution of values to generate additional nodes of a next hierarchical level; and
recursively repeating the choosing and splitting, wherein each node on the tree comprises a set of the URLs.

3. The method according to claim 2, the choosing the particular key having a smallest distribution of values being based on an entropy value determined for the particular key, the entropy values being determined by comparing a number of values under the particular key with a total number of the URLs.

4. The method according to claim 1, the identifying one or more pairs of nodes further comprising:
identifying, as duplicate clusters, a plurality of groups of URLs having duplicate content;
determining an overlap between the nodes in the tree for identifying the one or more pairs of nodes, the overlap being determined based on the number of duplicate clusters corresponding to each node.

5. The method according to claim 4, the determining the overlap further comprising:
initializing an index list with the duplicate clusters; and
determining whether a particular pair of nodes is a member of one or more duplicate clusters in the index list.

6. The method according to claim 1, the generating the candidate rule further comprising determining a mapping relationship between the keys of the first and second nodes in each of the pairs of nodes by estimating a rate of common values shared by the keys in comparison with a predetermined threshold, the mapping relationship being used for generating a URL rewrite operation of the candidate rule.

7. The method according to claim 1, further comprising:
testing the one or more candidate rules against the set of URLs to determine a false positive rate for each rule; and
removing a candidate rule having a false positive rate above a predetermined threshold.

8. The method according to claim 1, the selecting one or more of the candidate rules as one or more deployable rules further comprising:
determining a popularity for each node having a candidate rule associated therewith, the popularity being determined based on a number of URLs covered by each node having a candidate rule associated therewith;
identifying conflicting or redundant candidate rules; and
discarding conflicting or redundant candidate rules originating at popular nodes.

9. A computer-implemented method comprising:
obtaining a set of data from a source;
generating a plurality of key-value pairs from the set of data, the key-value pairs representing data portions of the set of data; and
constructing a pattern tree by:
creating a root node for the set of data;
choosing a particular key having a smallest distribution of values;
splitting the data into multiple subgroups according to the values of the particular key identified as having the smallest distribution of values to generate additional nodes of a next hierarchical level.

10. The method according to claim 9, further comprising generating a candidate rule by determining a first node and a second node that correspond to duplicate content in the set of data, the candidate rule relating a pattern of the first node to a pattern of the second node.

11. The method according to claim 10, the generating the candidate rule further comprising determining a key-to-key mapping relationship between the first node and the second node for use in generating the candidate rule.

12. The method according to claim 10, wherein a plurality of candidate rules are generated and further comprising selecting one or more rules from the of candidate rules for use during interaction with the source based on a popularity determined for nodes associated with the plurality of candidate rules.

13. Computer-readable storage media containing processor-executable instructions to be executed by a processor for carrying out the method according to claim 9.

14. A computing device comprising:
a processor coupled to computer-readable storage media containing instructions executable by the processor;
tree construction component implemented by the processor to construct a pattern tree based on a plurality of key-value pairs, the key-value pairs representing portions of a plurality of Uniform Resource Locators (URLs); and
a rule generation component implemented to identify a pair of nodes of the tree relating to duplicate content for generating a rule.

15. The computing device according to claim 14, the tree construction component being implemented to create nodes of the pattern tree by choosing a particular key having a smallest distribution of values and splitting the URLs into multiple subgroups according to the values of the particular key chosen as having the smallest distribution of values to generate additional nodes of a next hierarchical level, wherein each node on the pattern tree comprises a set of the URLs.

16. The computing device according to claim 14, the rule generation component being implemented to generate the rule for rewriting a portion of a URL of a first node of the pair of nodes to a format of a URL of a second node of the pair of nodes.

17. The computing device according to claim 15, the rule generation component being implemented to determine a mapping relationship between the keys of the first node and second node in the pair of nodes by estimating a rate of common values shared by the keys of the first node and second node in comparison with a predetermined threshold, the mapping relationship being used for generating the rule for rewriting.

18. The computing device according to claim 14, the rule generation component being implemented to generate a plurality of rules for a plurality of pairs of nodes, further comprising a rule selection component to select deployable rules from the plurality of rules, the rule selection component selecting the deployable rules based at least in part on a popularity determined for each node of the plurality of pairs of nodes.

19. The computing device according to claim 14, further comprising a search engine maintained on the computer storage media and implemented by the processor the search engine comprising a web crawler that obtains a set of sample URLs from a targeted website, the set of sample URLs being decomposed by the tree construction component into the key-value pairs, each key-value pair representing a portion of URL syntax of a URL of the set of sample URLs.

20. The computing device according to claim 19, further comprising the search engine being implemented to apply the rule during crawling of the targeted website for normalizing one or more URLs a first format to a second format according to the rule from to avoid downloading duplicate content during the crawling of the targeted website.

* * * * *